(12) United States Patent
Honda et al.

(10) Patent No.: US 10,676,226 B2
(45) Date of Patent: Jun. 9, 2020

(54) ULTRASONIC SEALING METHOD AND DEVICE FOR BAGS

(71) Applicant: Toyo Jidoki Co., Ltd., Minato-ku, Tokyo (JP)

(72) Inventors: Yasuyuki Honda, Iwakuni (JP); Tohru Yoshikane, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 548 days.

(21) Appl. No.: 15/366,298

(22) Filed: Dec. 1, 2016

(65) Prior Publication Data

US 2017/0158364 A1 Jun. 8, 2017

(30) Foreign Application Priority Data

Dec. 2, 2015 (JP) ................................ 2015-235304

(51) Int. Cl.
*B65B 51/22* (2006.01)
*B65B 31/02* (2006.01)
(Continued)

(52) U.S. Cl.
CPC ............ *B65B 51/225* (2013.01); *B29C 65/08* (2013.01); *B29C 65/18* (2013.01); *B29C 65/72* (2013.01); *B29C 65/7841* (2013.01); *B29C 65/7882* (2013.01); *B29C 66/006* (2013.01); *B29C 66/0342* (2013.01); *B29C 66/1122* (2013.01); *B29C 66/21* (2013.01); *B29C 66/24221* (2013.01); *B29C 66/3452* (2013.01); *B29C 66/3494* (2013.01); *B29C 66/43121* (2013.01); *B29C 66/81431* (2013.01); *B29C 66/81433* (2013.01); *B29C 66/81811* (2013.01); *B29C 66/8242* (2013.01); *B29C 66/83221* (2013.01); *B29C 66/849* (2013.01); *B65B 31/00* (2013.01);
(Continued)

(58) Field of Classification Search
CPC .................................................... B65B 51/225
See application file for complete search history.

(56) References Cited

U.S. PATENT DOCUMENTS

| 4,734,142 A | * | 3/1988 | Creswell | ................. B29C 65/08 156/267 |
| 5,642,606 A | * | 7/1997 | Ohlsson | ................. B29C 65/08 156/580.2 |
| 2015/0328855 A1 | | 11/2015 | Honda et al. | |

FOREIGN PATENT DOCUMENTS

| EP | 0708022 A | 4/1996 |
| EP | 2248721 A | 11/2010 |

(Continued)

*Primary Examiner* — J C Jacyna
(74) *Attorney, Agent, or Firm* — Norton Rose Fulbright US LLP

(57) ABSTRACT

An ultrasonic sealing method and device for a bag, in which pressurized gas spray outlets (47, 52) are provided at distal ends of a horn (31) and an anvil (32) so as to be used as gas blowing nozzles, the distal ends of the horn and the anvil are placed against a cutout (19) formed in a gas compartment (16) of the bag, a gas is blown into the gas compartment to inflate it, and then the horn and the anvil clamp films surrounding the cutout while the gas blowing is in progress, so that ultrasonic sealing is carried out by the horn to the films to trap the gas inside the gas compartment. A contact member (71) is provided directly under the horn. The contact member is pressed against inflated film (18) of the gas compartment, and in this state ultrasonic vibration energy is supplied to the horn.

17 Claims, 17 Drawing Sheets

(51) Int. Cl.
  *B29C 65/00* (2006.01)
  *B29C 65/78* (2006.01)
  *B29C 65/18* (2006.01)
  *B29C 65/72* (2006.01)
  *B29C 65/08* (2006.01)
  *B65B 31/00* (2006.01)
  *B65B 61/20* (2006.01)
  *B29L 31/00* (2006.01)

(52) U.S. Cl.
  CPC ............ *B65B 31/024* (2013.01); *B65B 61/20* (2013.01); *B29C 66/439* (2013.01); *B29C 66/53263* (2013.01); *B29L 2031/7128* (2013.01)

(56) References Cited

FOREIGN PATENT DOCUMENTS

| | | |
|---|---|---|
| JP | 2004-255742 A | 9/2004 |
| JP | 2004-331109 A | 11/2004 |
| JP | 2006-192902 A | 7/2006 |
| JP | 2007-118961 A | 5/2007 |
| JP | 2009-132001 A | 6/2009 |
| JP | 2010-023887 A | 2/2010 |
| JP | 2015-006915 A | 1/2013 |
| JP | 2014-139090 A | 7/2014 |
| JP | 2014-169117 A | 9/2014 |
| JP | 2014-181064 A | 9/2014 |
| WO | WO 99/39979 A | 8/1999 |

* cited by examiner

ULTRASONIC SEALING METHOD AND DEVICE FOR BAGS

BACKGROUND OF THE INVENTION

1. Field of the Invention

The present invention relates to an ultrasonic sealing method and device that clamps a bag from both sides by a horn and an anvil of an ultrasonic sealing device, and ultrasonic vibration energy transmitted from the horn seals films on both sides of the bag together or seals the films on both sides of the bag and a part, such as a spout, sandwiched therebetween.

2. Description of the Related Art

Patent Literature 1 to 3 disclose rotary bag-filling packaging machines. The rotary bag-filling packaging machine disclosed therein includes a plurality of pairs of grippers that are moved along an annular movement path. As the grippers make one rotation along this movement path, bags are supplied successively to the grippers, their side edges are held by the grippers so that the bags hang down with their mouths facing up, and then the bags are conveyed along a specific conveyance path. In these rotary bag-filling packaging machines, various packaging steps are successively carried out in the course of the bag conveyance, including a step of opening the bag mouth, a step of filling the bag with its contents, and a step of sealing the mouth. Also, in these rotary bag-filling packaging machines, the mouth sealing step is performed by an ultrasonic sealing device.

Patent Literature 4 discloses a rotary spout insertion and sealing apparatus (that manufactures a bag equipped with a spout (called "spouted bag"). This rotary spout insertion and sealing apparatus includes a plurality of spout holding members that are intermittently moved along an annular movement path. As the spout holding members make one rotation along this movement path, spouts are successively supplied to the spout holding members, these spouts are held vertically by the spout holding members, and then the spouts are conveyed along a specific conveyance path. In this rotary spout insertion and sealing apparatus, an insertion and temporary sealing step (in which a bag is supplied to a spout that is held by the spout holding members, the lower portion of the spout (such lower portion will be called "to-be-sealed portion") is inserted into the mouth of the bag, and then the films and the to-be-sealed portion are temporarily sealed together), a step of performing main sealing one or more times (in which the sealing of the films on both sides of the bag as well as the sealing of the to-be-sealed portion with the films on both sides are performed simultaneously), and a step of cooling the seal are successively carried out in the course of this conveyance. Patent Literature 4 further discloses that this rotary spout insertion and sealing apparatus fills the spouted bags thus obtained with their contents on the above-described conveyance path. The main sealing step is carried out by clamping the bag mouth from both sides of the bag between a pair of hot plates (the to-be-sealed portion of the spout is sandwiched between the films on both sides).

Patent Literature 5 to 7 disclose gas trapping method and apparatuses for a bag that has a gas compartment which extends in the longitudinal direction and is integrally formed at the sealed part on the side edge of the bag. A hole or cutout that allows the outside of the bag to communicate with the interior of the gas compartment is formed in the film of a gas introduction portion of the gas compartment. A pressurized gas is blown into the gas compartment of the bag, and the gas is trapped in this gas compartment. The gas trapping apparatuses of Patent Literature 5 to 7 include a plurality of pairs of grippers that are moved intermittently along an annular movement path, and as the grippers make one rotation along the movement path, the bags are successively supplied to the grippers, their side edges are held by the grippers, and then the bags are hanged down and conveyed along a specific conveyance path with the mouths of the bags facing up. A gas-blowing-in step (in which a nozzle is provided to the gas introduction portion and pressurized gas is blown into the interior of the gas compartment), a blocking step (in which the flow of gas into the gas compartment and the gas introduction portion is blocked off), and a gas trapping step (in which the gas introduction portion or the nearby area is sealed so that the gas is trapped inside the gas compartment) are successively performed in the course of the conveyance. The gas trapping step is performed by clamping the gas introduction portion or the nearby area of the bag from both sides with a pair of hot plates.

Furthermore, the specification and drawings of Japanese Patent Application 2014-99452 (Japanese Patent Application Laid-Open (Kokai) No. 2015-214366 that corresponds to the U.S. patent application Ser. No. 14/710,339 (U.S. Patent Application Publication No. 2015/0328855)) disclose an invention in which a horn and an anvil of an ultrasonic sealing device are used to blow pressurized gas into the gas compartment of a bag that is the same bag as bags equipped with gas compartments disclosed in Patent Literature 5 to 7 After blowing in of a pressurized gas, the area near a cutout or a hole in the gas introduction portion is ultrasonically sealed so as to trap the pressurized gas in the gas compartment.

The main embodiments of the invention of this prior application will be described below with reference to the accompanying FIGS. 8 through 18.

(1) First Embodiment

FIG. 11 shows a bag 11 equipped with a gas compartment (hereinafter referred to simply as the bag 11). The bag 11 is a bottom-gusset type of self-standing bag, and it is composed of front and rear films and a folded-up bottom film. In the upper region X of the bag 11, the front and rear films of the bag 11 are bonded at their edges on both sides, forming sealed parts 12 and 13. The front and rear films are not bonded at the top edge, forming an open mouth 14. In the lower region Y of the bag 11, the front and rear films are bonded at the edges on both sides with the bottom film sandwiched therebetween, the bottom film itself is also bonded on the folded inner side, and the front and rear films are each bonded to the bottom film in the middle (the bottom film is not bonded to itself), thus forming a sealed part 15. The sealed parts 12, 13, and 15 are indicated by hatching in FIG. 11.

A non-bonded part (gas compartment) 16 where the front and rear films are not bonded together is formed in a portion of the sealed part 12.

The gas compartment 16 is an unsealed location where no pressing was performed in the heat-sealing of the front and rear films of the bag (see 17 and 18 in FIG. 13), and it has a closed profile extending in a slender shape downward from near the mouth 14 (the upper end of the sealed part 12). A cross-shaped cutout 19 that allows the outside of the bag to communicate with the inside of the gas compartment 16 is formed in the front and rear films near this upper end. A narrow portion 16b is formed in the gas compartment 16 over a specific length below a circular gas introduction portion 16a in the center of which the cutout 19 is formed, and below this narrow portion 16b is a wider main portion 16c.

FIG. 8 shows a rotary packaging machine that includes the gas trapping device of the invention described in the above-described prior application. The rotary packaging machine shown in FIG. 8 includes a bag conveyance device in which a plurality of pairs of left and right bag conveyance grippers 21 and 22 are installed at a regular spacing around a table that rotates intermittently. In this bag conveyance device, the bag conveyance grippers 21 and 22 grip the supplied bags 11 from both side edges (the sealed parts 12 and 13) and intermittently convey the bags along a circular conveyance path while they are hanging down. At the various stop positions (stop positions I to VIII) at which the grippers 21 and 22 make stops, after the supply of a bag 11 to the grippers 21 and 22, various packaging steps that include opening up of the bag mouth, filling of the bag with its contents, and sealing of the mouth are successively performed on the bags 11 gripped by the grippers 21 and 22; and further a gas trapping method is performed that includes a step of blowing a gas into the gas compartment 16 and a step of sealing the gas compartment 16.

The grippers 21 and 22 both comprise a pair of grip members, and as seen from FIG. 11, the gripper 21 grips the narrow portion 16b of the gas compartment 16 so that the gripper 21 goes across the narrow portion 16b horizontally. As shown in FIG. 11, a shallow groove 24 running in the up and down direction is formed on the inside (the gripped face) of one of the grip members 23 of the gripper 21; and when the grippers 21 have gripped the sealed part 12, the groove 24 superposes the narrow portion 16b.

In the above-described rotary packaging machine, as seen from FIG. 8, a conveyor magazine type of bag feeder 25 is disposed at the stop position I of the conveyance path, a printer (only a head 26 thereof is illustrated) is disposed at the stop position II, an opening device (only a pair of suction cups 27 and an opening head 28 are illustrated) is disposed at the stop position III, a filling device (only a nozzle 29 is illustrated) is disposed at the stop position IV, an ultrasonic sealing device (only a horn 31 and an anvil 32 are illustrated) is disposed at the stop position V, a first sealing device that seals the bag mouth (only a pair of hot plates 33 is illustrated) is disposed at the stop position VI, a second sealing device that seals the bag mouth (only a pair of hot plates 34 is illustrated) is disposed at the stop position VII, and a cooling device (only a pair of cooling plates 35 is illustrated) is disposed at the stop position VIII.

FIG. 9 shows the ultrasonic sealing device of the invention of the above-described prior application. This ultrasonic sealing device includes the horn 31 and anvil 32, an ultrasonic vibration generator 36 that vibrates the horn 31, and an air cylinder 37 that moves the horn 31 and anvil 32 back and forth. Attachment members 41 and 42 are fixed to the distal ends of piston rods 38 and 39 of the air cylinder 37, respectively, the ultrasonic vibration generator 36 is fixed to the attachment member 41, and the anvil 32 is fixed to the attachment member 42. This ultrasonic sealing device has a cooling means (not shown), and the ultrasonic vibration generator 36, the horn 31, and the anvil 32 are cooled by this cooling means.

A hole (gas channel) 43 is formed inside the horn 31. One end of the hole 43 opens at the side face of the horn 31 and is connected to a pressurized gas supply source 46 via a connector 44, a pipe 45, a shutoff valve (not shown), etc., and the other end of the hole 43 opens at the distal end of the horn 31 so as to serve as a spray outlet 47 for the pressurized gas. A hole (gas channel) 48 is formed inside the anvil 32. One end of the hole 48 opens at the rear end of the anvil 32 and is connected to the pressurized gas supply source 46 via a connector 49 and a pipe 51, and the other end of the hole 48 opens at the distal end of the anvil 32 so as to serve as a spray outlet 52 for the pressurized gas. The horn 31 and the anvil 32 serve also as nozzles for blowing a gas.

The horn 31 and the anvil 32 are provided to opposite or to face each other with the conveyance path of the bag 11 in between, and they are moved by the air cylinder 37 forward (toward the conveyance path) and backward (away from the conveyance path) between a forward position and a retracted position, perpendicular to the bag 11, and symmetrically to each other. When the horn 31 and the anvil 32 are in their retracted positions (see (a) of FIG. 10), the horn 31 and the anvil 32 are farthest away from the conveyance path, and this avoids interference with the bags 11 conveyed along the conveyance path. When the horn 31 and the anvil 32 have come to their forward positions (see (c) of FIG. 10), the horn 31 and the anvil 32 are closest to the conveyance path, and the distal ends of the horn 31 and the anvil 32 clamp the bag 11. The spacing between the distal ends of the horn 31 and the anvil 32 is equal to the thickness of the films on both sides of the gas introduction portion 16a of the gas compartment 16 of the bag. The air cylinder 37 is a three-position type, allowing the horn 31 and the anvil 32 to stop at their intermediate positions between (and in addition to) the retracted positions and the forward positions. This intermediate position (hereinafter referred to as a blow-in position) is a position that is extremely close to the forward position (see (b) of FIG. 10 and FIG. 13), so that a gas is blown into the gas compartment 16 by the horn 31 and the anvil 32 that are stopped at their intermediate positions.

One example of a packaging method (that includes a gas trapping method) performed by the rotary packaging machine shown in FIG. 8 will be described below with reference to FIGS. 8 through 15.

(a) At the stop position I (bag feed position), bags 11 are supplied from the conveyor magazine type of bag feeder 25 to the grippers 21 and 22, and the grippers 21 and 22 grip the sealed parts 12 and 13 at specific positions on the front and back sides of each bag. The gas compartment 16 of the bag at this point is gripped at its narrow portion 16b by the gripper 21. This state is shown in (a) of FIG. 11.

(b) At the stop position II (printing position), the bag face is printed on by a printer.

(c) At the stop position III (opening position), the bag is opened by an opening device. The pair of suction cups 27 of the opening device facing the bag 11 are moved backward and forward and, when moved forward, suction the films on both sides of the bag 11 and then moved backward while keep suctioning the films to open the bag mouth 14. The opening head 28 moves up and down above the bag 11; and when it has descended, its lower end goes through the bag mouth 14 into the bag and blows gas into the bag.

(d) At the stop position IV (content filling position), the bag is filled with, for instance, liquid contents by a filling device (see the contents 53 in (b) of FIG. 11). The nozzle 29 of the filling device moves up and down above the bag 11; and when it has descended, it is brought, through the bag mouth 14, into the bag and fills the bag with the liquid.

(e) At the stop position V (gas blowing and sealing position), the ultrasonic sealing device shown in FIG. 9 is disposed near the conveyance path of the bag 11, and a gas blowing step in which a gas is blown into the gas compartment 16 of the bag 11 and a sealing step in which the films surrounding the cutout 19 are sealed is performed.

When the bag 11 is stopped at the stop position V, as shown in (a) of FIG. 10, the horn 31 and the anvil 32 are retracted in their retracted positions. The air cylinder 37 is then actuated; and as shown in (b) of FIG. 10 and (a) of FIG. 13, the horn 31 and the anvil 32 are moved forward and stop at their positions (the blow-in positions), which are just short of their forward positions. The distal ends of the horn 31 and the anvil 32 at this point are opposite to face each other with a spacing D in between that is slightly greater than the thickness of the films on both sides of the gas introduction portion 16a of the bag. As shown in (b) of FIG. 11, the inside diameters (diameters) of the spray outlets 47 and 52 of the horn 31 and the anvil 32 are set to be less than the diameter of the gas introduction portion 16a of the gas compartment 16. Consequently, the gas sprayed out from the spray outlets 47 and 52 collects in the gas introduction portion 16a, allowing the gas to be blown into the gas compartment 16 more efficiently. If the gas introduction portion 16a is not circular, the inside diameters of the spray outlets 47 and 52 should be set to be less than the width of the gas introduction portion (the width in the bag width direction).

The spraying of the pressurized gas from the spray outlets 47 and 52 is started either simultaneously with the stopping of the horn 31 and the anvil 32 at their blow-in positions or at a suitable point before or after that. When the gas is blown from the spray outlets 47 and 52 through the cutout 19 and into the gas introduction portion 16a of the gas compartment 16 of the bag, the films 17 and 18 on both sides of the gas introduction portion 16a inflate, and as shown in (b) of FIG. 13, the films of that portion press snugly against the flat distal end faces 54 and 55 of the horn 31 and the anvil 32 (see FIG. 9). Therefore, the gas introduction portion 16a of the bag cannot inflate any further, and its inflation state is restricted to a thin, flat shape. The above-described spacing D is set so that the inflation state of the gas introduction portion 16a makes a flat shape.

The pressurized gas that has entered the gas introduction portion 16a spreads apart, by an amount equal to the depth of the groove 24, the films on the front and back sides of the narrow portion 16b gripped by the gripper 21, flows through the gap formed between the films into the main portion 16c, and then inflates the main portion 16c. The state when the main portion 16c of the bag has been inflated is shown in (c) of FIG. 13.

The air cylinder 37 is again actuated at a specific timing after the horn 31 and the anvil 32 stop at the blow-in positions, the horn 31 and the anvil 32 are moved forward and immediately reach the forward position, and then as shown in (c) of FIG. 10, the distal ends of the horn 31 and the anvil 32 clamp the gas introduction portion 16a (the films surrounding the cutout 19) of the gas compartment 16 of the bag, thus flattening out the gas introduction portion 16a that had been inflated into a thin, flat shape.

Next, ultrasonic vibration is generated from the ultrasonic vibration generator 36, and its vibration energy is supplied to the horn 31, so that as shown in (a) of FIG. 12, a ring-shaped ultrasonically sealed part 56 (the ring-shaped area that is shown hatched) is formed coinciding with the shape (the shape of the distal end face 54 of the horn 31) of the site (the clamped portion) clamped by the horn 31 and the anvil 32. Although all or most of the cutout 19 of the gas introduction portion 16a is itself not sealed, the films surrounding the cutout 19 are sealed, so that the gas inside the gas compartment 16 is sealed therein and does not leak out from the cutout 19.

When the ultrasonic sealing is finished (when the generation of ultrasonic waves is finished), there is no more frictional heat generated by ultrasonic vibration, and the ultrasonically sealed part 56 clamped by the distal ends of the horn 31 and the anvil 32 is immediately cooled by the horn 31 and the anvil 32. After the ultrasonic sealing is finished, the air cylinder 37 is operated in reverse at a suitable timing, so that the horn 31 and the anvil 32 retract until they stop at their retracted positions, as shown in (d) of FIG. 10.

The spraying of the pressurized gas from the spray outlets 47 and 52 is preferably continued at least until just before the horn 31 and the anvil 32 reach the forward positions and clamp the gas introduction portion 16a of the bag.

(f) At the stop position VI (first sealing position), the pair of hot plates 33 clamp the bag mouth 14 and heat-seal it, forming a sealed part 57 (see (b) FIG. 12). Since the sealing of the gas compartment 16 has already been completed, at this point there is no need to clamp the site of the cutout 19 with the hot plates 33.

(g) At the stop position VII (second sealing position), the pair of hot plates 34 again clamp the sealed part 57 to perform heat-sealing for the second time.

(h) At the stop position VIII (sealed part cooling and discharge step), the pair of cooling plates 35 clamp and cool the sealed part 57. Then, the grippers 21 and 22 are opened during cooling, then the cooling plates 35 are also opened, allowing the bag 11 (finished bag) to drop and be discharged out of the packaging machine through a chute 50.

2) Second Embodiment

In the First Embodiment above, the cutout 19 is formed in the films 17 and 18 on both sides of the gas introduction portion 16a of the bag 11 equipped with a gas compartment. A cutout can be instead formed in only one of the films. In this case, either the horn 31 or the anvil 32 will serve as a receiving member that supports the film on the side where the cutout is not formed (see the receiving member 12 in Japanese Patent Application Laid-Open (Kokai) No. 2007-118961, for example). There is no need to form an internal gas channel on the side that serves as the receiving member.

(3) Third Embodiment

In the First Embodiment above, the horn 31 and the anvil 32 stopped at three positions, namely, the retracted positions, the forward positions, and the blow-in positions. They can be instead set to stop at just their retracted positions and forward positions. More specifically, the blowing of a pressurized gas into the gas compartment of a bag and the ultrasonic sealing steps can be both performed at the forward positions. In this case, the air cylinder 37 is of a two-position type. Also, longitudinal vibration (vibration perpendicular to the welding face) energy is supplied to the horn 31.

This embodiment will now be described in specific terms with reference to FIGS. 14 and 15 (and FIGS. 8 and 9).

When the bag 11 is stopped at the stop position V (see FIG. 8), as shown in (a) of FIG. 14, the horn 31 and the anvil 32 are retracted in their retracted positions.

The air cylinder 37 is then actuated (see FIG. 9), and the horn 31 and the anvil 32 are moved forward from the retracted positions, during the course of which gas begins to be sprayed out of the spray outlets 47 and 52 at the distal ends of the horn 31 and the anvil 32. As shown in (b) of FIG. 14, as the horn 31 and the anvil 32 approach their forward positions, gas flows through the cutout 19 and goes into the gas compartment 16 of the bag, inflating the gas compartment 16. Then, as shown in (c) of FIG. 14 and (a) of FIG.

15, the horn 31 and the anvil 32 reach their forward positions, and their distal end faces 54 and 55 (see FIG. 9) clamp the films surrounding the cutout 19. Although the spraying of the gas out of the spray outlets 47 and 52 continues, the flow of gas into the gas compartment 16 stops at this point. The horn 31 and the anvil 32 reach their forward positions from their retracted positions in an extremely short time, during which not enough gas is blown into the gas compartment 16, and the gas compartment 16 is not sufficiently inflated at the point when the horn 31 and the anvil 32 have reached their forward positions.

Next, ultrasonic vibration energy (longitudinal vibration) is supplied to the horn 31, the horn 31 vibrates (advances or retracts with respect to the anvil 32) at a fine amplitude (from about a few dozen microns to roughly 130 µm) and a high frequency, and ultrasonic sealing is commenced. The vibration direction of the horn 31 is indicated by the double-headed arrow in (b) of FIG. 15. When the horn 31 has retracted by the above-described amplitude, which increases the spacing between the horn 31 and the anvil 32, the films on both sides of the clamped site (the site clamped by the distal end faces 54 and 55 of the horn 31 and the anvil 32) are pushed apart by the pressure of the gas sprayed out of the spray outlets 47 and 52, creating a minute gap, and at that instant the gas flows through that gap and into the gas compartment 16.

Over time, the amount of gas that flows into the gas compartment 16 increases, the gas compartment 16 inflates accordingly (see (d) of FIG. 14 and (b) of FIG. 15), and then a sealant in an inner layer of the films is melted by frictional heat to block off the above-described gap (the flow of gas into the gas compartment 16 is stopped again at this point), and the films on both sides of the clamped site are sealed. Although the amount of time the ultrasonic vibration energy is supplied to the horn 31 is generally extremely short (under 1.0 seconds, and usually about 0.2 to 0.4 seconds), the blowing of the gas into the gas compartment 16 and the subsequent ultrasonic sealing of the gas compartment 16 are carried out during this time, and the gas is trapped inside the gas compartment 16. After the ultrasonic sealing, the spraying of the gas from the spray outlets 47 and 52 is halted. The resulting ultrasonically sealed part has the same ring shape as the distal end face 54 of the horn 31, just as with the ultrasonically sealed part 56 shown in (a) of FIG. 12.

When the supply of vibration energy to the horn 31 is stopped and the ultrasonic sealing is finished, no more frictional heat is generated at the ultrasonically sealed part of the films, and the ultrasonically sealed part clamped by the distal ends of the horn 31 and the anvil 32 is immediately cooled by the horn 31 and the anvil 32. After the ultrasonic sealing is finished, the air cylinder 37 is operated in reverse at a suitable timing, which retracts the horn 31 and the anvil 32 until they stop at their retracted positions as shown in (e) of FIG. 14.

Since ultrasonic sealing generally takes only an extremely short time, not very much of the gas will flow into the gas compartment 16 during that time. However, as described above, since a certain amount of gas (albeit an insufficient amount) does flow into the gas compartment 16 before the films surrounding the cutout 19 are clamped, a sufficient amount of gas in total flows into the gas compartment 16, and the gas compartment 16 of the bag sufficiently inflates.

(4) Fourth Embodiment

In the Fourth Embodiment as well, just as in the Third Embodiment above, the horn 31 and the anvil 32 stop only at their forward positions and retracted positions. However, although the distal end faces 54 and 55 of the horn 31 and the anvil 32 are flat in the Third Embodiment above, the Fourth Embodiment differs therefrom in that fine grooves are formed in one or both of the distal end faces 54 and 55.

The Fourth Embodiment will be described with reference to FIGS. 16 through 18.

As shown in FIGS. 17 and 18, a fine lattice of grooves 58 and 59 whose ends open to the inner periphery (the spray outlets 47 and 52) and/or the outer periphery are formed over the entire surfaces of the distal end faces 54 and 55 of the horn 31 and the anvil 32. The blowing of the gas into the gas compartment 16 and the ultrasonic sealing of the gas compartment 16 using the horn 31 and the anvil 32 are performed as follows, for example.

When the bag 11 is stopped at the stop position V (see FIG. 8), the horn 31 and the anvil 32 are retracted at their retracted positions as shown in (a) of FIG. 16.

The air cylinder 37 is actuated (see FIG. 9), the horn 31 and the anvil 32 are moved forward from the retracted position and reach the forward position, and as shown in (b) of FIG. 16, their distal ends clamp the films surrounding the cutout 19 formed in the gas introduction portion 16a of the gas compartment 16, and then the gas is sprayed out of the spray outlets 47 and 52 at the distal ends.

The gas that enters into the gas introduction portion 16a from the cutout 19 pushes the film of the gas introduction portion 16a on the inside of the grooves 58 and 59 into the grooves 58 and 59, creating numerous small gaps between the films on both sides. Gas flows through these gaps into the narrow portion 16b below then flows into the main portion 16c further below, thereby inflating the gas compartment 16. However, the films surrounding the cutout 19 are not inflated while still being clamped by the distal ends of the horn 31 and the anvil 32 and are just pushed apart slightly within the grooves 58 and 59.

Next, ultrasonic vibration is generated from the ultrasonic vibration generator 36 at a specific timing, its ultrasonic vibration energy is supplied to the horn 31, and the films on both sides of the site clamped by the distal ends of the horn 31 and the anvil 32 (the area around the cutout 19) are ultrasonically sealed. In this ultrasonic sealing, a small gap appears between the films on both sides on the inside of the grooves 58 and 59, so that no frictional heat is generated and the sealant of the inner layer does not melt; however, the nearby melted sealant fills in this gap (at which point the flow of gas into the gas compartment 16 stops), and sealing is performed, including the films on the inside of the grooves 58 and 59, so that the gas is trapped inside the gas compartment 16. If the vibration energy supplied to the horn 31 is longitudinal vibration energy, the action discussed in the Third Embodiment above (whereby vibration of the horn 31 forms a minute gap between the films on both sides of the clamped part, and the gas flows through this gap into the gas compartment 16) is achieved at the same time.

The width w and depth d of the grooves 58 and 59 (see (b) of FIG. 17) formed in the distal end faces 54 and 55 of the horn 31 and the anvil 32 are set so that the above-described gap is formed when the gas is blown into the gas compartment 16, and this gap will be filled in by the surrounding melted sealant during the ultrasonic sealing.

The ultrasonically sealed part is in the same ring shape as the distal end face 54 of the horn 31 as in the ultrasonically sealed part 56 shown in (a) of FIG. 12.

When the ultrasonic sealing is finished (or when the generation of ultrasonic waves is finished), no more frictional heat is generated by ultrasonic vibration, and the ultrasonically sealed part clamped by the distal ends of the horn 31 and the anvil 32 is immediately cooled by the horn 31 and the anvil 32. After the ultrasonic sealing is finished, the air cylinder 37 is operated in reverse at a suitable timing, retracting the horn 31 and the anvil 32 until they stop at their retracted positions as shown in (c) of FIG. 16.

Patent Literature 1: Japanese Patent Application Laid-Open (Kokai) No. 2004-331109

Patent Literature 2: Japanese Patent Application Laid-Open (Kokai) No. 2010-23887

Patent Literature 3: Japanese Patent Application Laid-Open (Kokai) No. 2015-6915

Patent Literature 4: Japanese Patent Application Laid-Open (Kokai) No. 2004-255742

Patent Literature 5: Japanese Patent Application Laid-Open (Kokai) No. 2014-139090

Patent Literature 6: Japanese Patent Application Laid-Open (Kokai) No. 2014-169117

Patent Literature 7: Japanese Patent Application Laid-Open (Kokai) No. 2014-181064

In the examples given in Patent Literature 1 to 3, ultrasonic sealing is used to seal the mouth of a bag after it is filled with its contents. When ultrasonic sealing is performed (or when the part of the bag to be sealed is clamped by the horn and the anvil of the ultrasonic sealing device, and ultrasonic vibration energy is supplied to the horn), the spacing of the pair of grippers is widened, which makes the part to be sealed and the nearby area taut and closed in flat (see FIG. 1 of Patent Literature 1, for example). When the bag mouth is thus sealed, there are no particular problems such as damage to the bag caused by the ultrasonic sealing.

However, the following problem occurs when ultrasonic sealing is done for a gas compartment that has been inflated by pressurized gas as in the invention of Japanese Patent Application No. 201-99452 (U.S. patent application Ser. No. 14/710,339 (U.S. Patent Application Publication No. 2015/0328855)).

As shown in (a) of FIG. 6, when pressurized gas flows into the gas compartment 16 of the bag 11, and the horn 31 and the anvil 32 reach their forward positions, the films 17 and 18 at the site clamped by the horn 31 and the anvil 32 are pressed flat, and the portion under this site (the narrow portion 16b of the gas compartment 16) is inflated by the pressurized gas, creating a gap between the films 17 and 18.

When ultrasonic sealing is performed in this state, the film 18 of the narrow portion 16b of the inflated gas compartment 16 (the film on the horn 31 side) can be damaged, or a hole is formed, in the region adjacent to the site clamped by the horn 31 and the anvil 32 (the clamped site). This region (indicated by A in (a) of FIG. 6) covers a range of roughly a few millimeters downward from the lower end of the clamped site (the upper end of the inflated portion).

As shown in (b) of FIG. 6, the above problem does not occur at this site when no pressurized gas is blown into the gas compartment 16 of the bag 11 and only ultrasonic sealing is performed.

The same problem occurs when, as in Patent Literature 4, ultrasonic sealing is performed instead of sealing by hot plates during the main sealing step of a bag and a spout.

More specifically, as shown in FIG. 7, a bag 63 is supplied to a spout 62 that is held by a spout holding member 61, a to-be-sealed portion 62a at the lower part of the spout 62 (boat-shaped in top view, see the to-be-sealed portion 4 in Japanese Patent Application Laid-Open (Kokai) No. 2009-132001) comes into the mouth of the bag, and the films 66 and 67 on both sides of the bag 63 are clamped at the location of the to-be-sealed portion 62a by a horn 64 and an anvil 65. A gap between the films 66 and 67 is formed below the to-be-sealed portion 62a.

When ultrasonic sealing is performed in this state, it would happen that although the films 66 and 67 on both sides of the bag 63, as well as the films 66 and 67 and the to-be-sealed portion 62a, are sealed, the film 67 (the film on the horn 64 side) is damaged, or a hole is formed, in the region adjacent to the site clamped between the horn 64 and the anvil 65 (the clamped site). The above-described region (indicated by B in (a) and (b) of FIG. 7) covers a range of roughly a few millimeters downward from the lower end of the clamped site.

The inventors have learned that the above problem occurs only when there is a gap between the films on both sides in the region adjacent to the clamped site of a bag. In the ultrasonic sealing for the gas compartment of a bag, a gap is created between the films on both sides of the inflated gas compartment; and in the ultrasonic sealing of a spout, a gap is created between the films under the sealed part of the spout. It is not clear why the above-described problem occurs only when there is a gap between the films on both sides in the region adjacent to the clamped site. The inventors, nonetheless, surmise that the cause may lie in the fact that the film in this region is in contact with the lower end of the distal end of the horn and vibrates, or the vibration of the horn is transmitted such that it concentrates in the above-described region of the film on the horn side, bringing about resonance and heating in the film in this region; and as a result, the sealant in the inner layer of this film is not only softened but actually melts. This phenomenon is particularly likely to occur with a film to which an aluminum foil has been laminated.

BRIEF SUMMARY OF THE INVENTION

The present invention is conceived in light of the above problem that occurs when ultrasonic sealing is performed to the films on both sides of a bag or to the films on both sides of a bag and a part (or a component such as a spout) sandwiched between the films.

It is, therefore, an object of the present invention to prevent damages to and hole formation in the film of a bag that is on the horn side in the region adjacent to the site clamped by horn and anvil.

More specifically, the present invention relates to an ultrasonic sealing method in which a bag is clamped from its both sides by a horn and an anvil of an ultrasonic sealing device, and ultrasonic vibration energy transmitted from the horn seals the films on both sides of the bag together or seals the films on both sides of the bag and a part (such as, a spout) sandwiched therebetween; and in the present invention, a contact member is employed, so that if a gap is formed between the films on both sides in the region that is adjacent to the site clamped between the horn and the anvil (the clamped site), the contact member is moved (forward) from the horn side of the bag toward such region and is pressed against the film on the horn side, and the ultrasonic vibration energy is supplied to the horn in this state, so that the horn carries out the ultrasonic sealing.

This ultrasonic sealing method of the present invention assumes the following embodiments, among others:

(1) The bag to be processed is a bag in which a gas compartment that extends in the longitudinal direction of a bag is integrally formed at the sealed part of the side edge of the bag, and a hole or cutout (collectively called "air intake means") that allows the inside of the gas compartment to communicate with the outside of the bag is formed in the film of a gas introduction portion of the gas compartment. In addition, a gas channel that is connected at its one end to a pressurized gas supply source and opens at its another end to the distal end is formed in the horn and/or the anvil (or in at least one of the horn and the anvil), and the other end of the channel serves as (or is) a spray outlet for the pressurized gas. A gas is blown into the gas compartment through the gas introduction portion by the horn and/or anvil to inflate the gas compartment, and then the film around the air intake means is ultrasonically sealed. In this case, the gap is one that is formed between the films on both sides of the gas compartment by inflating the gas compartment.

(2) In the case of (1) above, before the gas compartment is inflated, a contact member is moved forward so as to be brought to a specific location, so that the film on the horn side is pressed against the contact member when the gas compartment is inflated. The present invention thus encompasses a case that the film on the horn side is pressed against the contact member when the two films are inflated, so that the inflation is in a different shape than that resulting from natural inflation (or than that inflation is made without the use of the contact member).

(3) The above-described "part" is a spout, and after the lower portion of the spout (such lower part is called "to-be-sealed portion") has been inserted into the mouth of the bag, the mouth of the bag is clamped from both sides of the bag by a horn and an anvil, and the films both sides of the bag, as well as the films both sides of the bag and the to-be-sealed portion sandwiched between the films on both sides, are ultrasonically sealed. In this case, the gap is one that is formed between the two films, at the lower part of the bag mouth when the to-be-sealed portion of the spout is inserted into the mouth of the bag.

The ultrasonic sealing device according to the present invention is used to implement the above-described ultrasonic sealing method, and in addition to a horn and an anvil, the device includes a contact member that is disposed near the horn and moves forward and backward between a pressing position and a retracted position that is retracted from this pressing position. The contact member is disposed at the pressing position when ultrasonic vibration energy is supplied to the horn, and in this pressing position the contact member is pressed against a region of the film on the horn side that is adjacent to the site clamped by the horn and the anvil (the clamped site).

This ultrasonic sealing device of the present invention assumes the following embodiments, among others:

(1) The contact member is provided so that it is movable forward and backward with the horn.

(2) The bag to be processed is a bag in which a gas compartment that extends in the longitudinal direction of a bag is integrally formed at the sealed part of the side edge of the bag, and a hole or cutout (air intake means) that allows the inside of the gas compartment to communicate with the outside of the bag is formed in the film of a gas introduction portion of the gas compartment. In addition, a gas channel that is connected at its one end to a pressurized gas supply source and opens at its another end to the distal end is formed in the horn and/or the anvil (or at least one of the horn and the anvil), and the other end of the channel serves as (or is) a spray outlet for the pressurized gas. A gas is blown into the gas compartment through the gas introduction portion by the horn and/or anvil to inflate the gas compartment, and then the film around the air intake means is ultrasonically sealed. The contact member is, at its pressing position, pressed against the film on the horn side of the gas compartment.

(3) The above-described "part" is a spout, and the mouth of the bag is clamped from both sides by the horn and the anvil, and the films on both sides of the bag, as well as the films on both sides of the bag and the to-be-sealed portion of the spout sandwiched by between the films, are ultrasonically sealed. The contact member is pressed against the film on the horn side of the lower part of the bag mouth.

The above-described ultrasonic sealing device is favorably applicable to an apparatus (see FIG. 8) for trapping a gas in a bag equipped with a gas compartment or to an apparatus (see Patent Literature 4) for manufacturing a bag equipped with a spout.

As seen from the above, according to the present invention, when ultrasonically sealing the films on both sides of a bag or ultrasonically sealing the films on both sides of a bag with a part (a spout, for instance) sandwiched therebetween, even if a gap should be formed between the films on both sides of the bag in the region adjacent to the site clamped between the horn and anvil (the clamped site), the problem of damage to or hole formation in the film on the horn side in such region is prevented. It is unclear why the above-described problem is prevented by moving the contact member forward from the horn side toward such region and pressing the distal end of the contact member against the film on the horn side (in other words, the film on the horn side is pushed into the contact member and deformed in this region, or the film on the horn side that is inflated is pressed against the contact member, thus making inflation in a different shape from that resulting from natural inflation); nonetheless, it is surmised that when the contact member comes into contact with the film on the horn side as described above, a direct contact between the film on the horn side and the lower corner of the distal end of the horn is lessened or that there is less resonance of the ultrasonic vibration in the film on the horn side.

DETAILED DESCRIPTION OF THE INVENTION

The ultrasonic sealing method and device according to the present invention will be described below more specifically mainly with reference to FIGS. 1 through 5.

Figure 1:
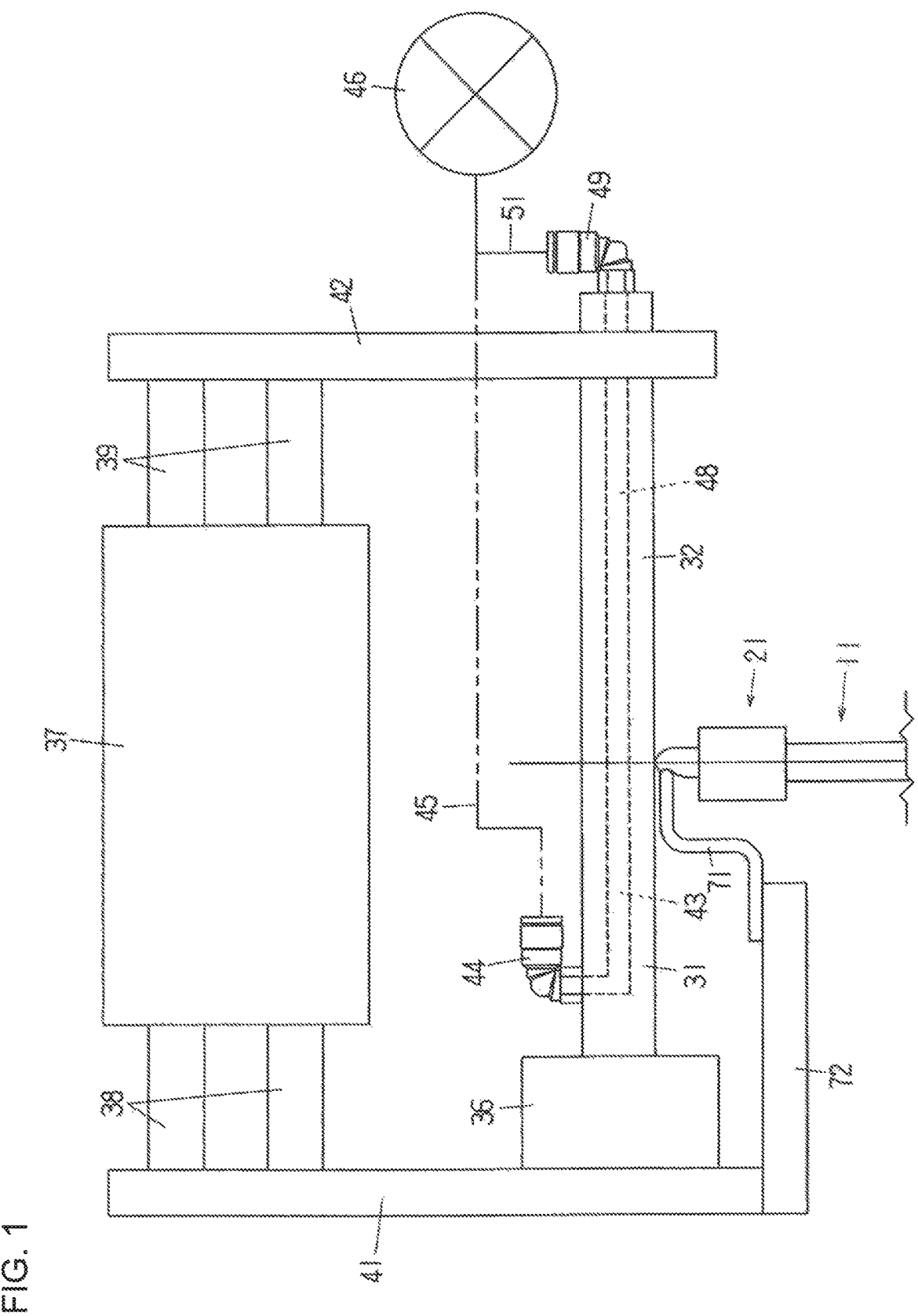
FIG. 1 is a side view of an ultrasonic sealing device according to the present invention.
Figure 9:
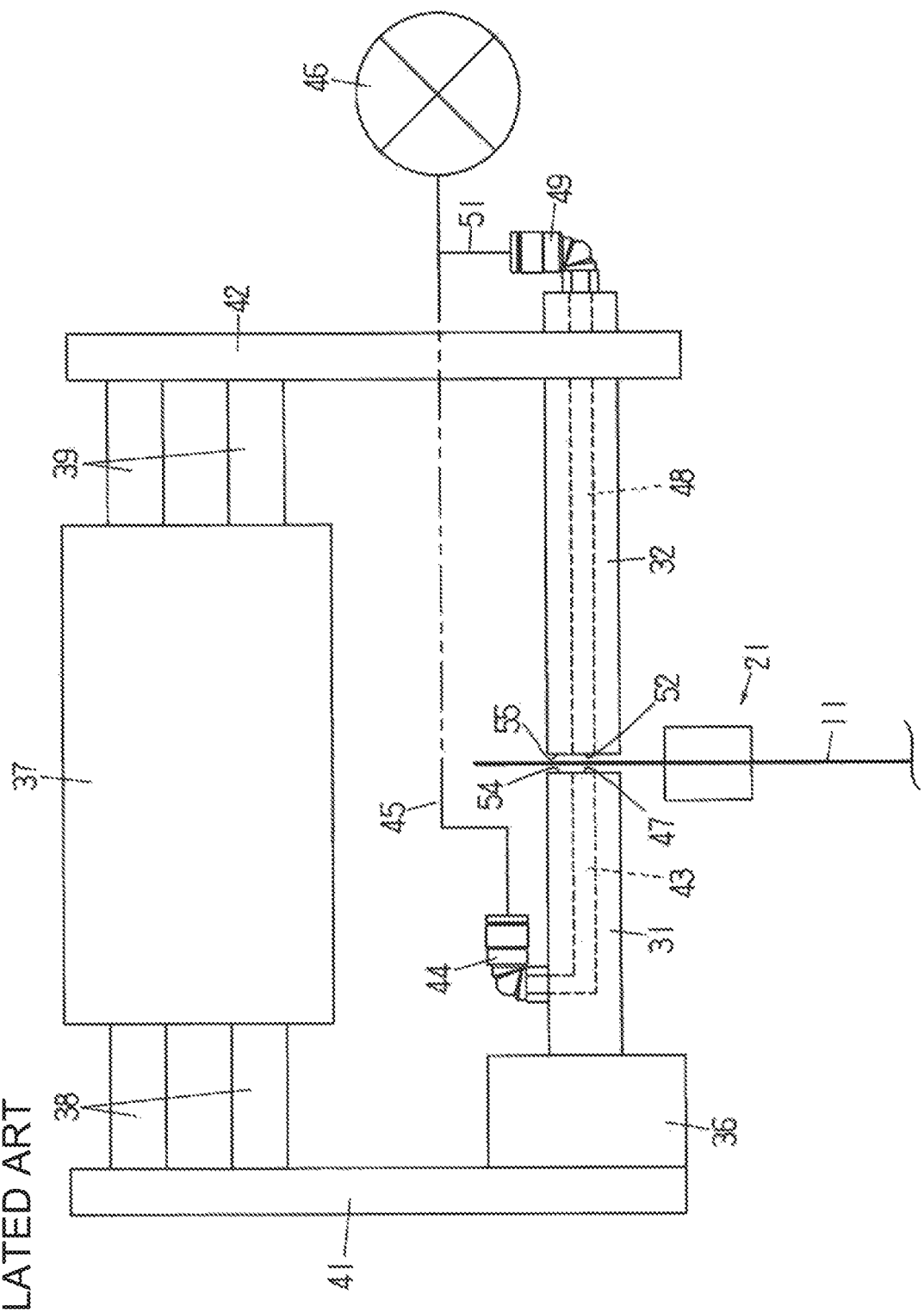
FIG. 9 is a side view of the ultrasonic sealing device of the invention in a prior application.

FIG. 1 shows an ultrasonic sealing device according to the present invention. This ultrasonic sealing device is an improved version of the ultrasonic sealing device shown in FIG. 9, and it differs from the ultrasonic sealing device of FIG. 9 in that it includes a contact member 71. Those components that are substantially the same as in the ultrasonic sealing device of FIG. 9 are numbered the same as those in FIG. 1.

The contact member 71 is provided on an attachment member 41 on the horn 31 side via an attachment plate 72, and it is movable forward and backward with the horn 31, in the same direction as the horn 31, at a position directly under the horn 31. The position where the attachment member 41 is provided is selected so that that the amplitude of ultrasonic vibration is zero (nodal point), and the contact member 71 itself does not vibrate. The contact member 71 is composed of a sheet of metal or plastic, and a rubber piece is attached as necessary to the distal end that comes into contact with the bag 11 in order to prevent damage to the bag 11.

Figure 8:
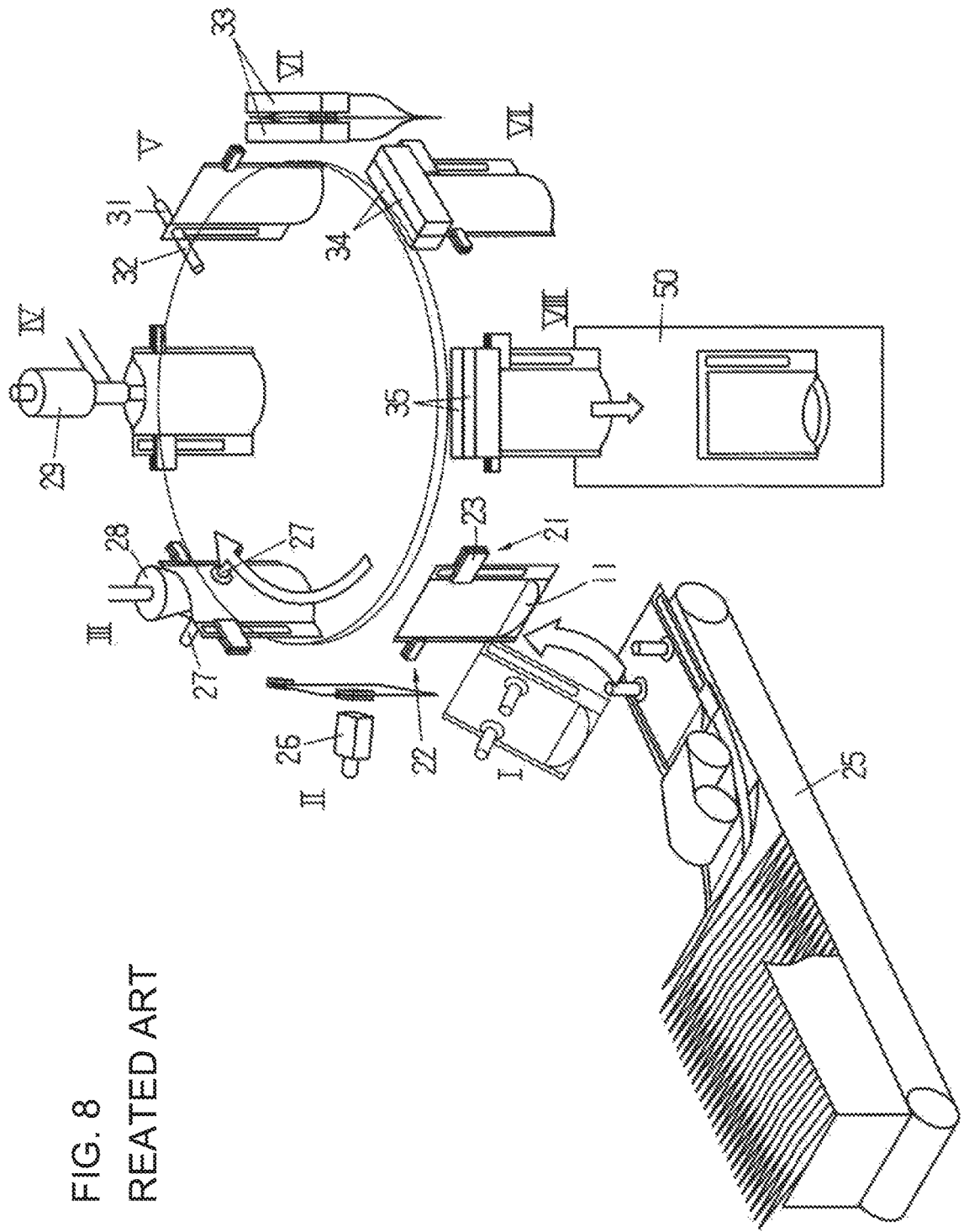
FIG. 8 is a simplified perspective view of a rotary packaging machine that includes the gas trapping device of an invention in a prior application.
Figure 11:
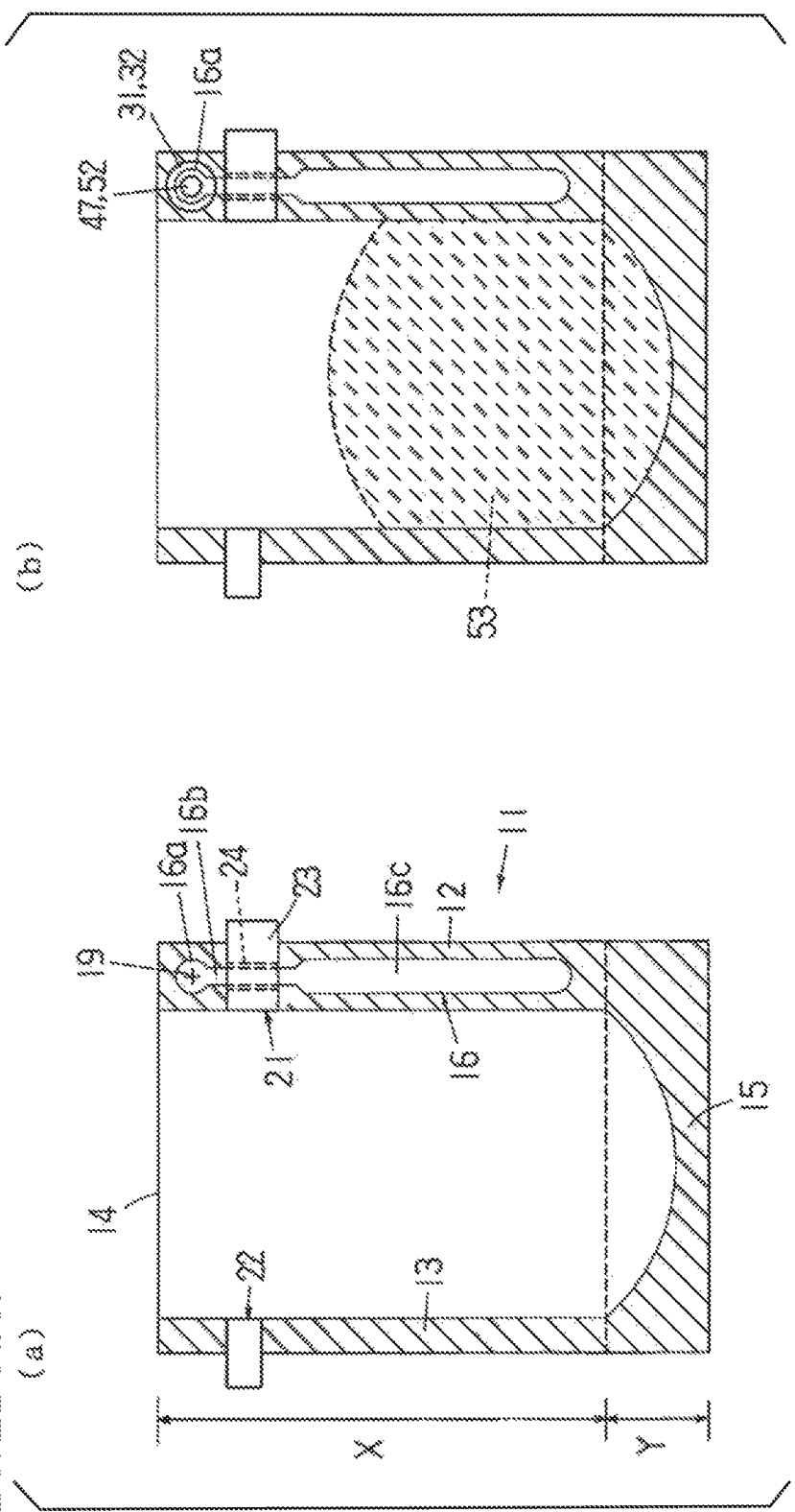
FIGS. 11((a) and (b)) shows front views of the step sequence of a gas trapping method of the invention in a prior application.

The gas trapping method (including an ultrasonic sealing method) when the ultrasonic sealing device shown in FIG. 1 is installed in place of the ultrasonic sealing device of FIG. 9 near the stop position V of the rotary packaging machine of FIG. 8 will be described with reference to FIGS. 2 and 3. The bag 11 shown in FIGS. 1 to 3 has the same structure as the bag 11 shown in FIG. 11, so that the bag conveyance grippers 21 and 22 of the rotary packaging machine grip both side edges of the bags and intermittently convey the bags along a circular conveyance path while they are hanging down. With this rotary packaging machine, the various packaging steps are carried out in order as described in relation to FIG. 8 at various stop positions; and along with this, a gas trapping method is performed that is comprised of a step of blowing a gas into the gas compartment 16 at stop position V and a step of sealing the gas compartment 16.

Figure 2:
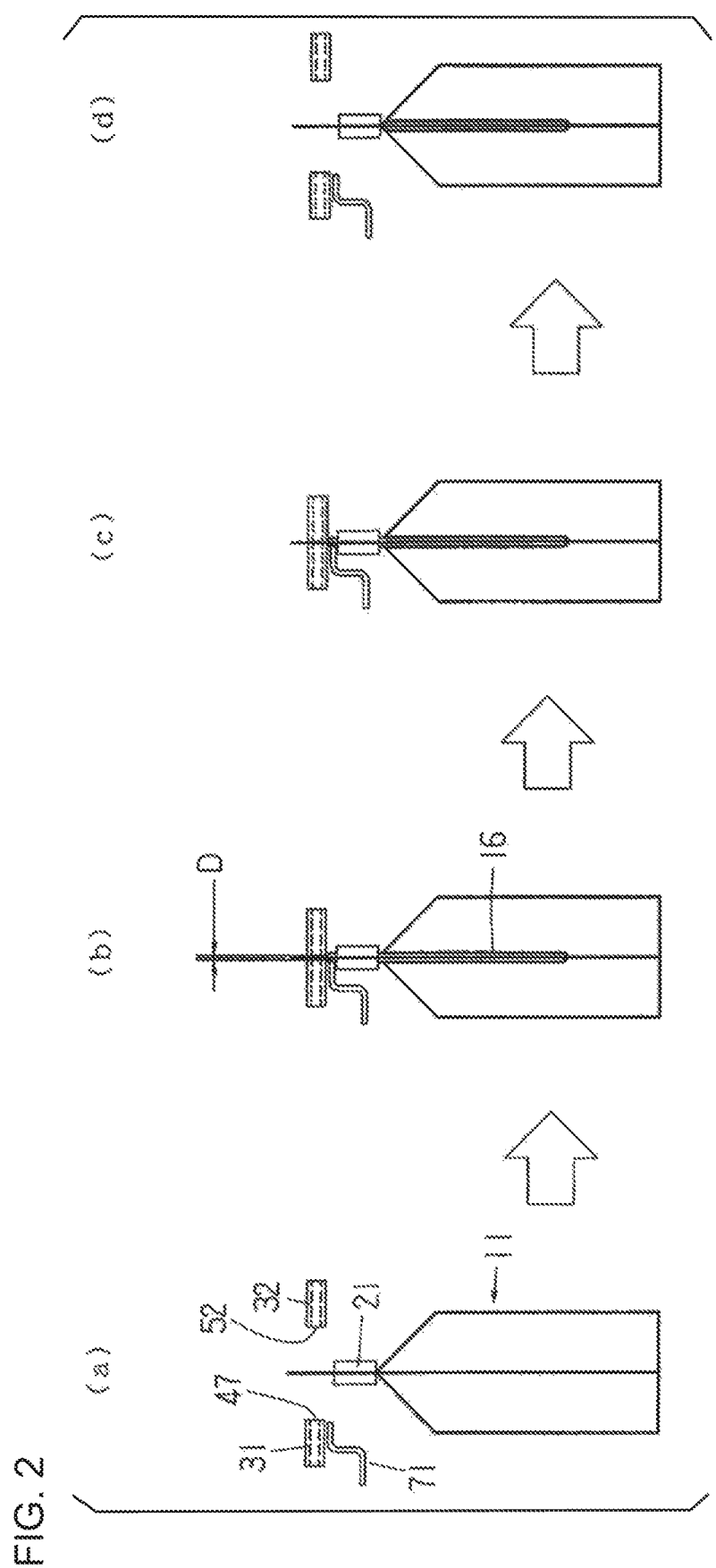
FIG. 2((a) through (d)) shows the step sequence of a gas trapping method (including an ultrasonic sealing method) that makes use of the ultrasonic sealing device shown in FIG. 1.
Figure 10:
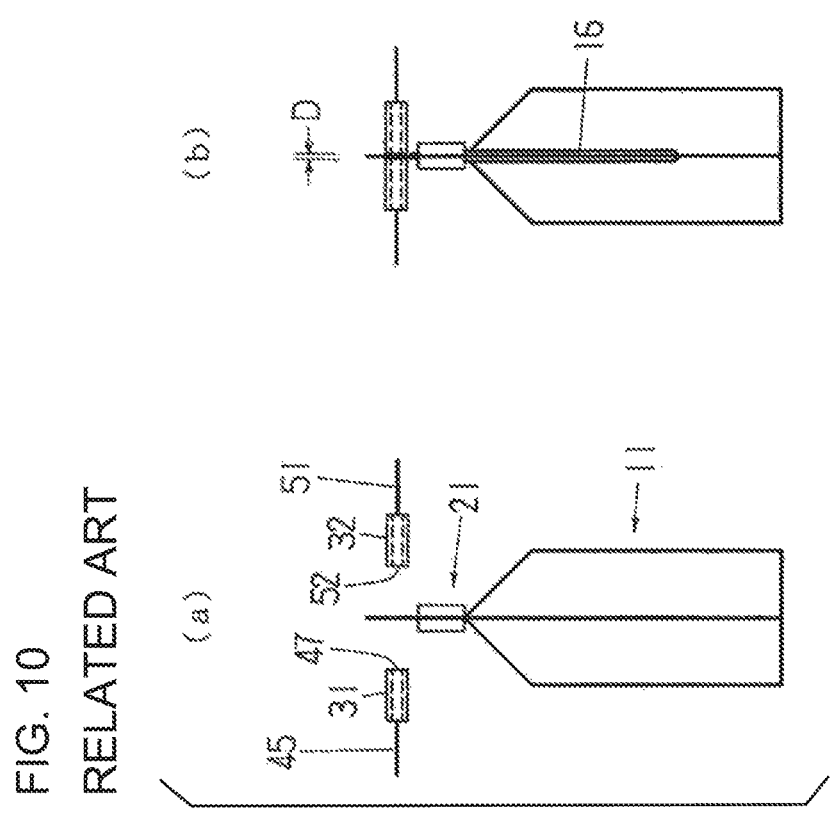
FIG. 10((a) through (d)) shows side views of the step sequence of a gas trapping method of the invention in a prior application.

As shown in (a) of FIG. 2, when the bag 11 is stopped at stop position V (see FIG. 8), the horn 31 and the anvil 32 have been retracted and in their retracted positions. The air cylinder 37 is then actuated; and as shown in (a) of FIG. 2 and (a) of FIG. 3, the horn 31 and the anvil 32 are moved thereby forward and stopped at positions just short of their forward positions (the blow-in positions). The distal ends of the horn 31 and the anvil 32 at this point are opposite (or face) each other at a spacing D that is slightly greater than the thickness of the films on both sides of the gas introduction portion 16a of the bag 11. Also, the contact member 71 is moved forward with the horn 31. In the gas trapping method shown in FIGS. 2 and 3, the timing of the movement of the horn 31 and the anvil 32, the spray of a pressurized gas, the ultrasonic sealing, and so forth is the same as that described with reference to FIG. 10.

When the horn 31 and the anvil 32 are stopped at the above-described blow-in positions, the spraying of pressurized gas from the spray outlets 47 and 52 is started either simultaneously or at a suitable point before or after the stop. When the gas is blown from the spray outlets 47 and 52 through the cutout 19 into the gas introduction portion 16a of the gas compartment 16 of the bag, the films 17 and 18 on both sides of the gas introduction portion 16a inflate and are pushed snugly against the flat distal end faces 54 and 55 of the horn 31 and the anvil 32, as shown in (b) of FIG. 3.

Figure 6:
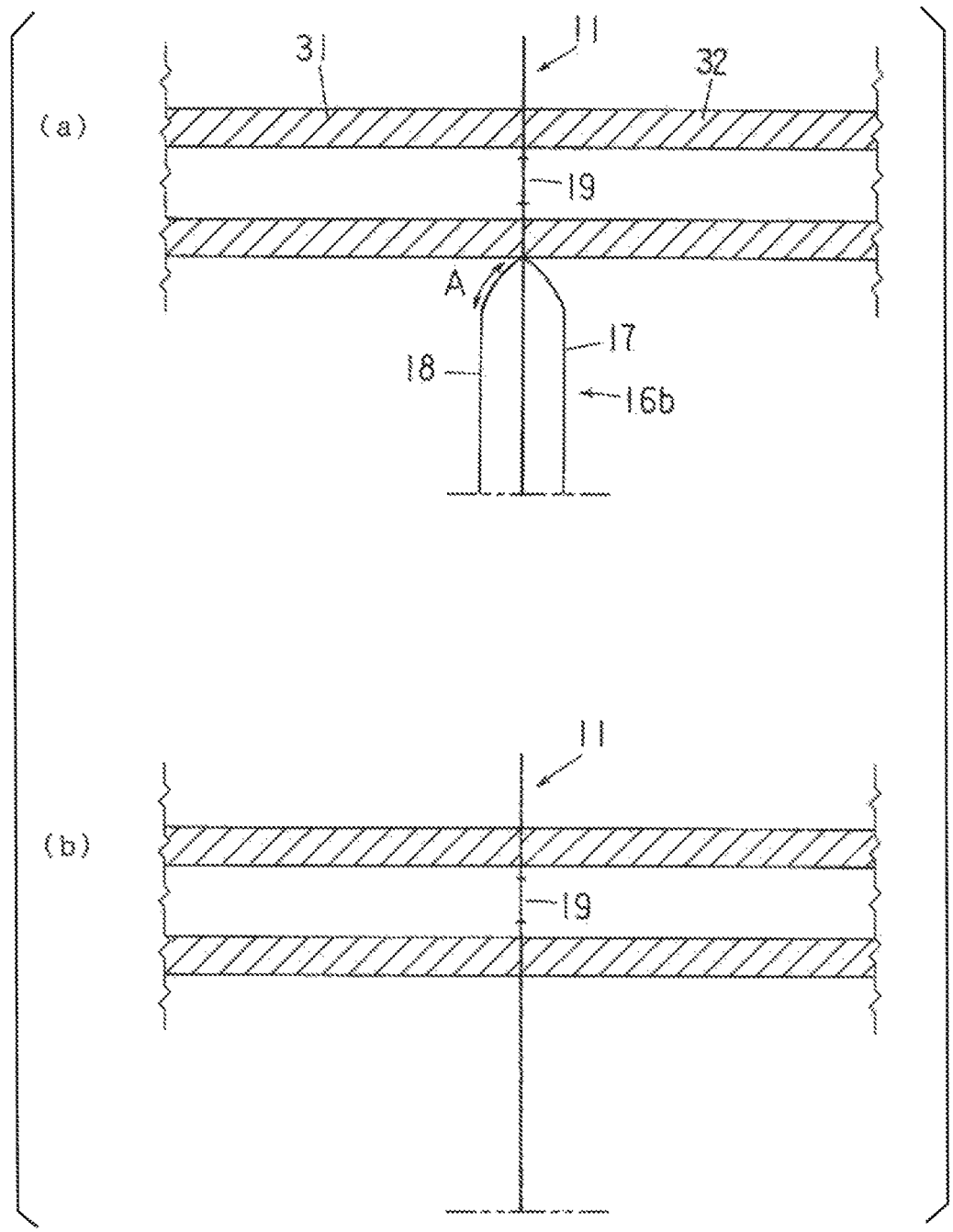
FIGS. 6((a) and (b)) illustrates the problems associated with an invention of a prior application.

The pressurized gas that has entered the gas introduction portion 16a spreads apart, by an amount equal to the depth of the groove 24, the films on the front and back sides of the narrow portion 16b clamped by the gripper 21, and then the gas flows through the gap formed between the films into the main portion 16c and inflates the main portion 16c of the bag. In this example, the distal end of the contact member 71 is slightly touching the film 18 of the inflated narrow portion 16b (the film on the horn 31 side). The location where the contact member 71 is in contact with the film is the region adjacent to the site clamped by the horn 31 and the anvil 32 (a location directly under the clamped site), and it is the region A shown in FIG. 6. However, the distal end of the contact member 71 at this point does not need in touch with the film 18.

Figure 3:
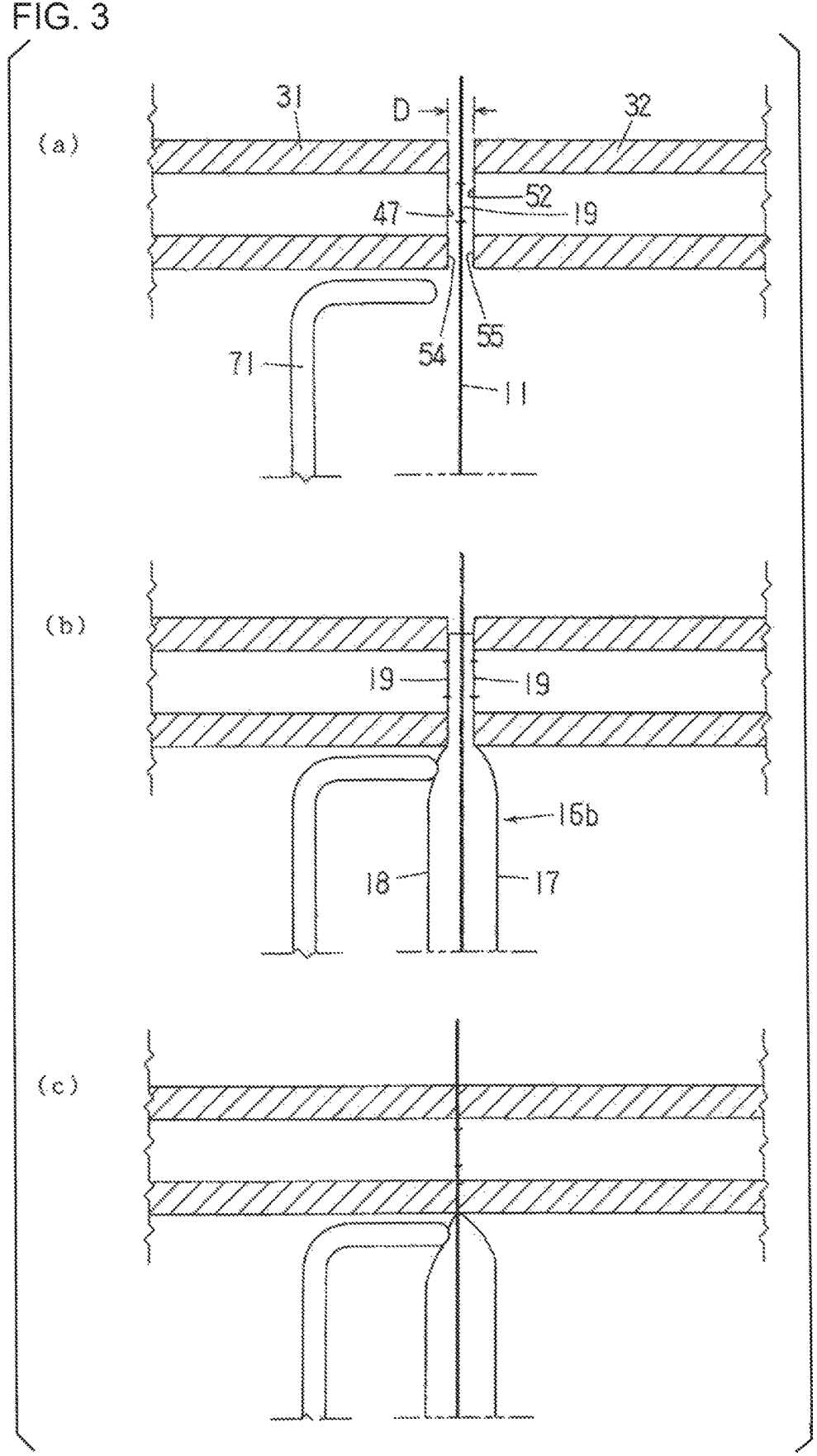
FIG. 3((a) through (c)) shows detailed side views of one mode of the operation of the contact member employed in the gas trapping method (ultrasonic sealing method) shown in FIG. 2.

The air cylinder 37 is again actuated at a specific timing after the horn 31 and the anvil 32 are stopped at their blow-in positions, so that the horn 31 and the anvil 32 are moved forward to immediately reach their forward positions, and as shown in (c) of FIG. 2 and (c) of FIG. 3, the distal ends of the horn 31 and the anvil 32 clamp the gas introduction portion 16a (the films surrounding the cutout 19) of the gas compartment 16 and flatten out the gas introduction portion 16a that has been inflated into a thin, flat shape. At this point, the contact member 71 is moved forward with the horn 31, so that it presses with its distal end against the film 18 of the inflated narrow portion 16b. As a result, the inflated film 18 is distended inward in the above-described region A. The contact member 71 preferably has a width that is equal to or greater than the width of the narrow portion 16b in top view and is pressed against the film 18 for over the entire width of the narrow portion 16b.

Ultrasonic vibration is next generated from the ultrasonic vibration generator 36, the vibration energy is supplied to the horn 31, the films surrounding the cutout 19 are ultrasonically sealed, and the gas is trapped inside the gas compartment 16. During this ultrasonic sealing, the contact member 71 is kept pressing against the film 18 of the inflated narrow portion 16*b*, thus preventing damage to or hole formation in the film 18 of the narrow portion 16*b*.

Figure 12:
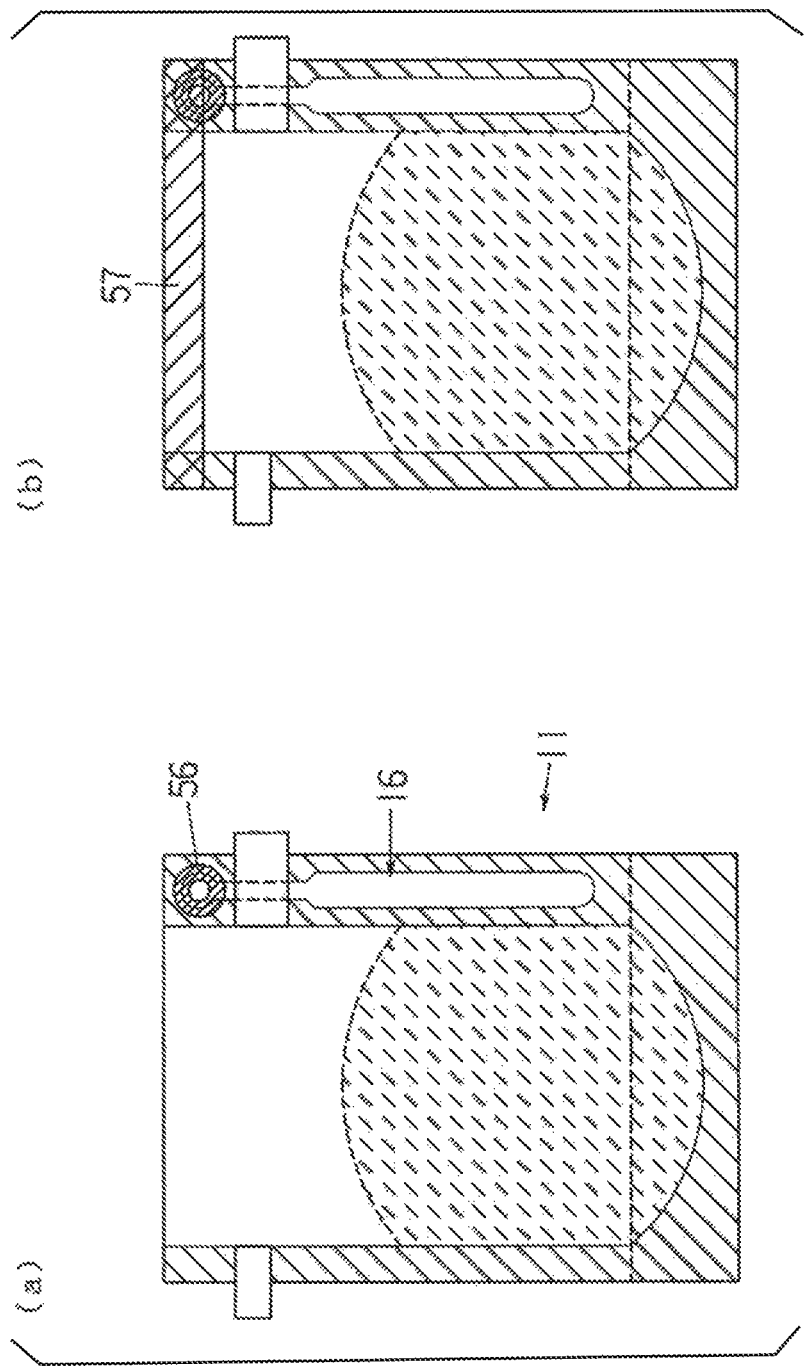
FIG. 12((a) through (b)) shows front views of the step sequence of steps following the gas trapping method shown in FIG. 11.
Figure 13:
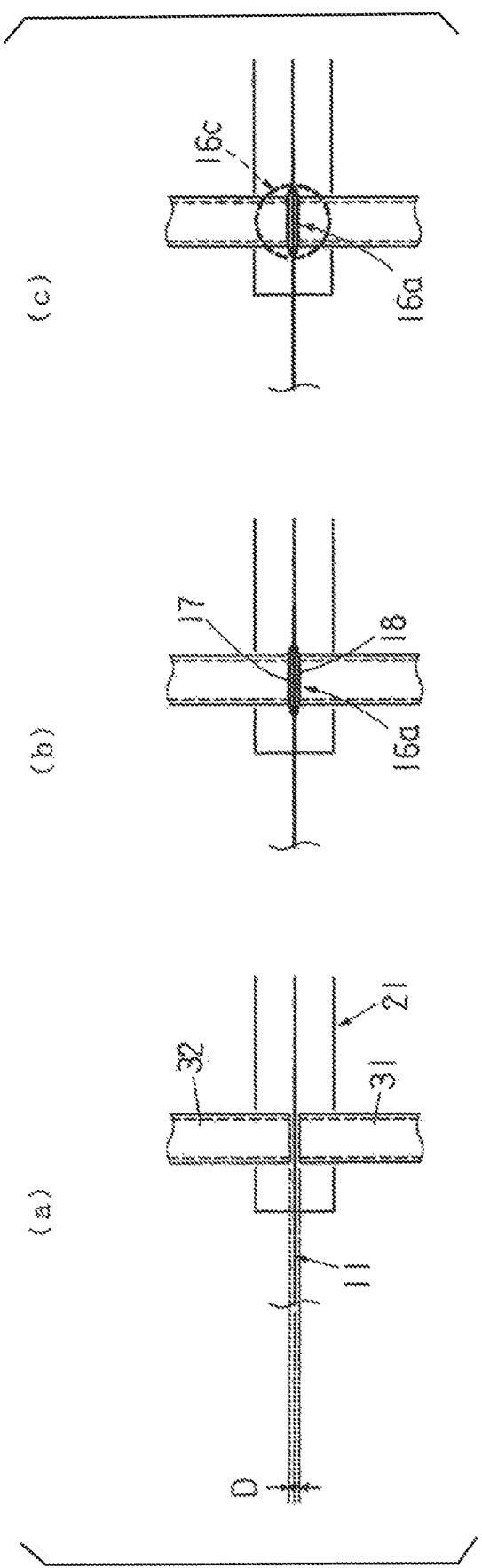
FIG. 13((a) through (c)) shows detailed top views of a gas trapping method of the invention in a prior application.

When the ultrasonic sealing is finished (or when the supply of ultrasonic vibration energy is finished), there is no more frictional heat generated by ultrasonic vibration, and thus the ultrasonically sealed part 56 (see FIG. 12) clamped by the distal ends of the horn 31 and the anvil 32 is immediately cooled by the horn 31 and the anvil 32. Also, after the ultrasonic sealing is finished, the air cylinder 37 is operated in reverse at a suitable timing, so that the horn 31 and the anvil 32 are retracted until they are stopped at their retracted positions as shown in (d) of FIG. 2. The contact member 71 is retracted with the horn 31.

Figure 4:
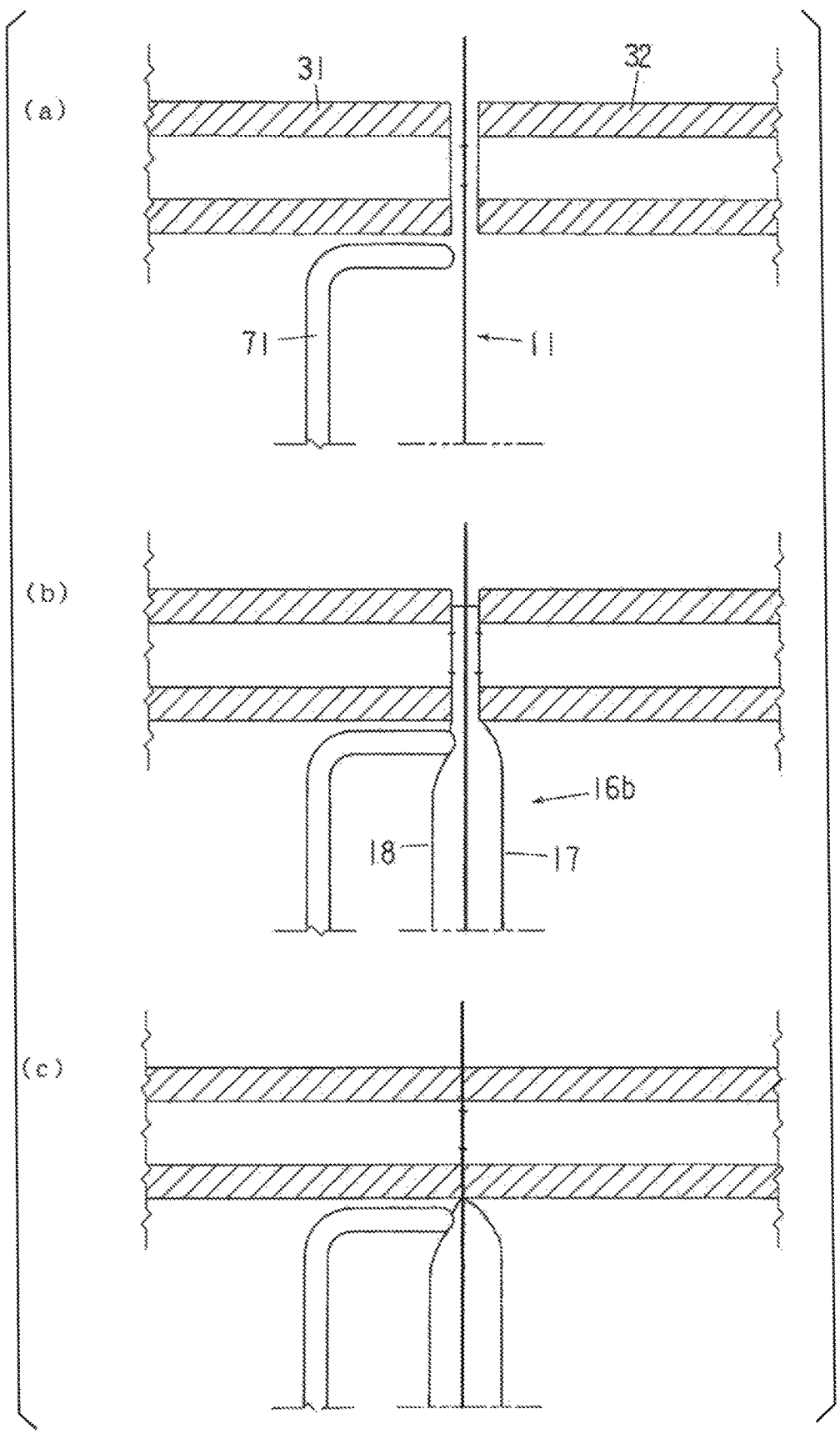
FIG. 4((a) through (c)) shows detailed side views of another mode of the operation of the contact member in the gas trapping method (ultrasonic sealing method) shown in FIG. 2.

In the example of FIGS. 2 and 3, the contact member 71 reaches the pressing position (the most forward position) after the inflation of the gas compartment 16 is made. However, as shown in FIG. 4, it can be set so that the contact member reaches the pressing position before the inflation of the gas compartment 16 is made. In this case, the contact member 71 is not moved forward and backward with the horn 31 (and is thus not installed on the attachment member 41), and it is moved forward and backward by a drive means that is independent from the horn 31.

More specifically, in FIG. 4, the timing of the movement of the horn 31 and the anvil 32, the spray of the pressurized gas, the ultrasonic sealing, and so forth is the same as those in FIGS. 2 and 3. On the other hand, at the point when the horn 31 and the anvil 32 reach their blow-in positions, the contact member 71 has been moved forward and reached its pressing position as shown in (a) of FIG. 4. Accordingly, when the pressurized gas is blown into the gas compartment 16 and the gas compartment 16 (the narrow portion 16*b*) inflates, the film 18 in the region A of the bag touches and is pressed against the contact member 71 and therefore is unable to freely inflate and is instead distended inward.

Then, when the horn 31 and the anvil 32 are moved forward and reach the forward position, as shown in (c) of FIG. 4, the contact member 71 is in the pressing position, and the ultrasonic vibration energy is supplied in this state to the horn 31 so that ultrasonic sealing is performed.

Figure 14:
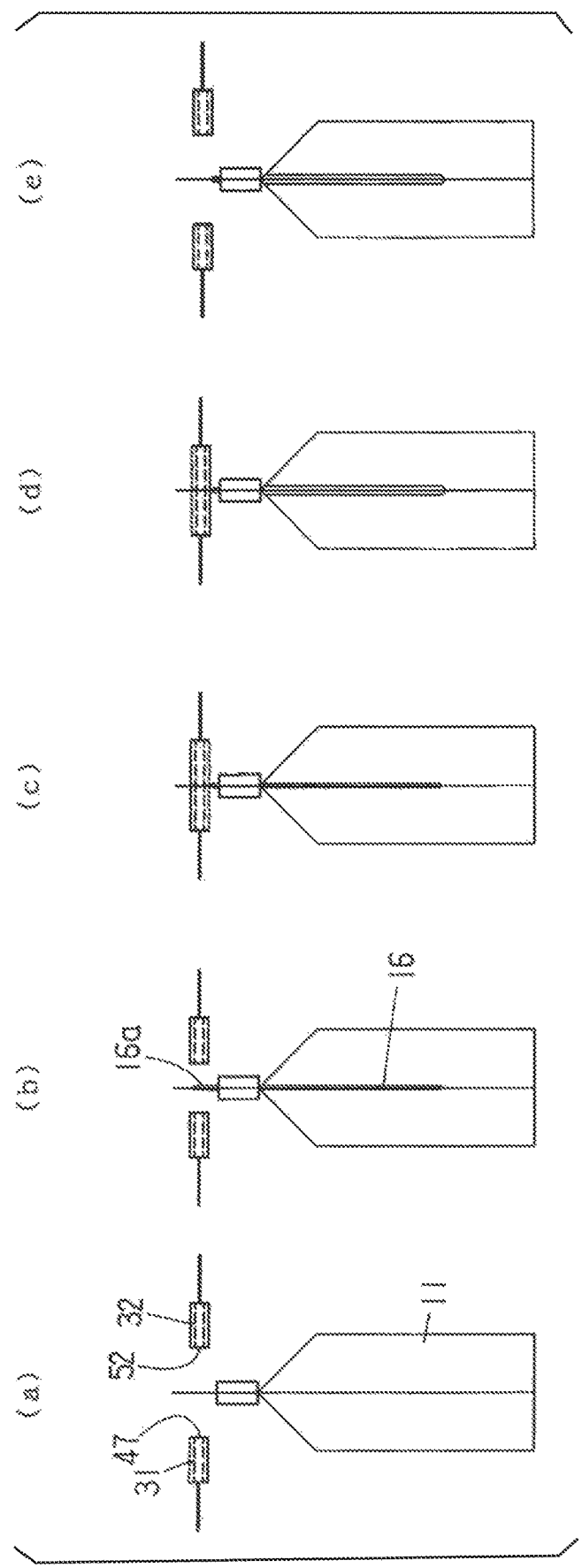
FIG. 14((a) through (e)) shows side views of the step sequence of another gas trapping method of the invention in a prior application.
Figure 15:
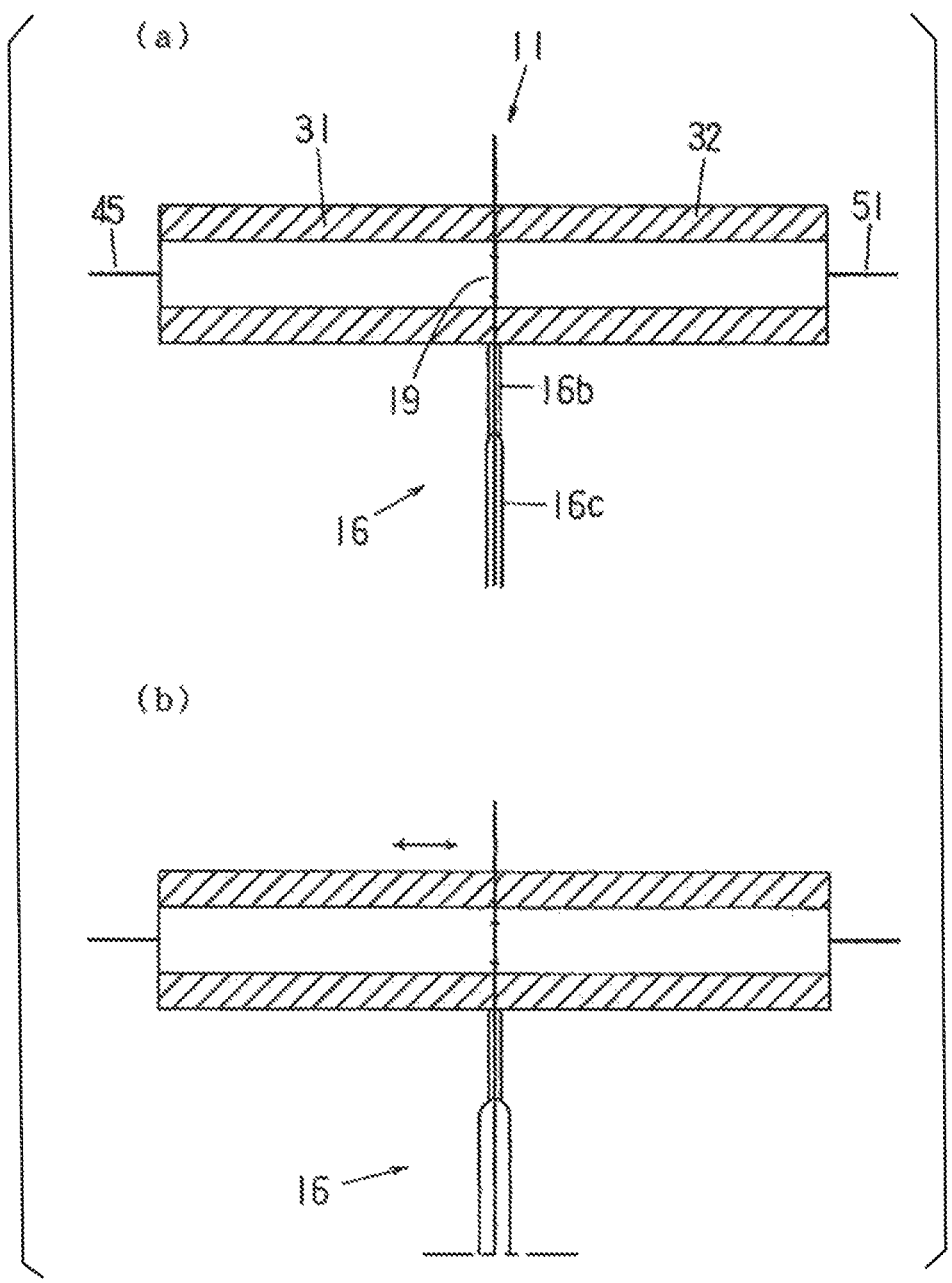
FIGS. 15((a) and (b)) shows cross-sectional views of a horn and an anvil in the gas trapping method shown in FIG. 14 when the horn and anvil clamp the films surrounding a cutout formed in the gas introduction portion of a gas compartment of a bag, (a) being of before ultrasonic vibration energy is supplied to the horn, and (b) being of after this supply has begun.
Figure 16:
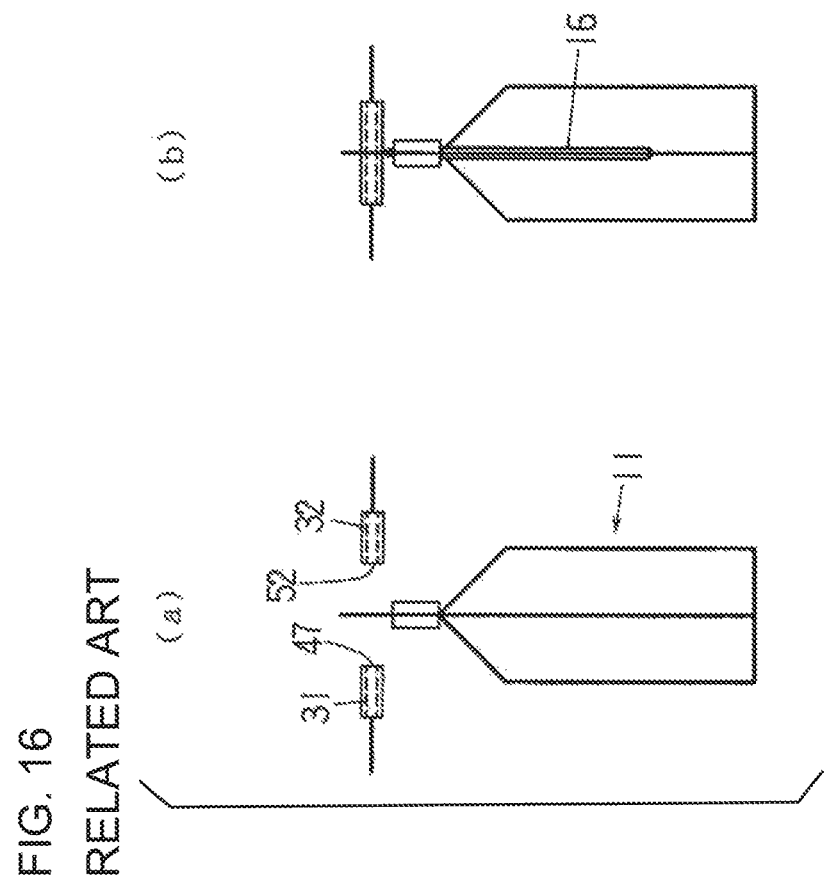
FIG. 16((a) through (c)) shows side views of the step sequence of another gas trapping method of the invention in a prior application.
Figure 17:
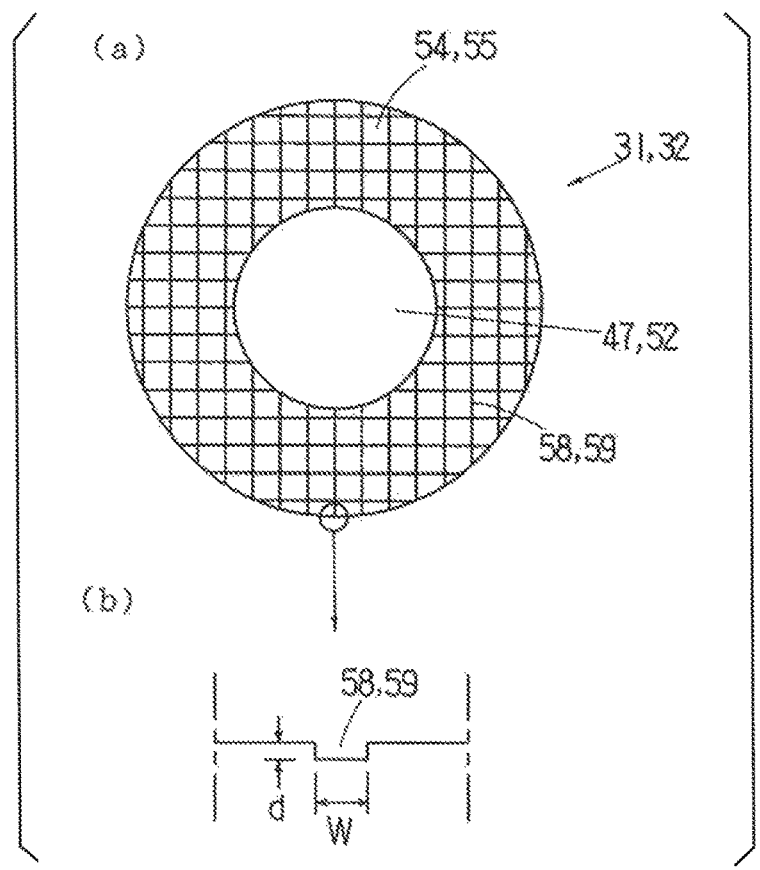
FIGS. 17((a) and (b)) shows a front view and an enlarged partial view of the horn and anvil used in the gas trapping method shown in FIG. 16.
Figure 18:
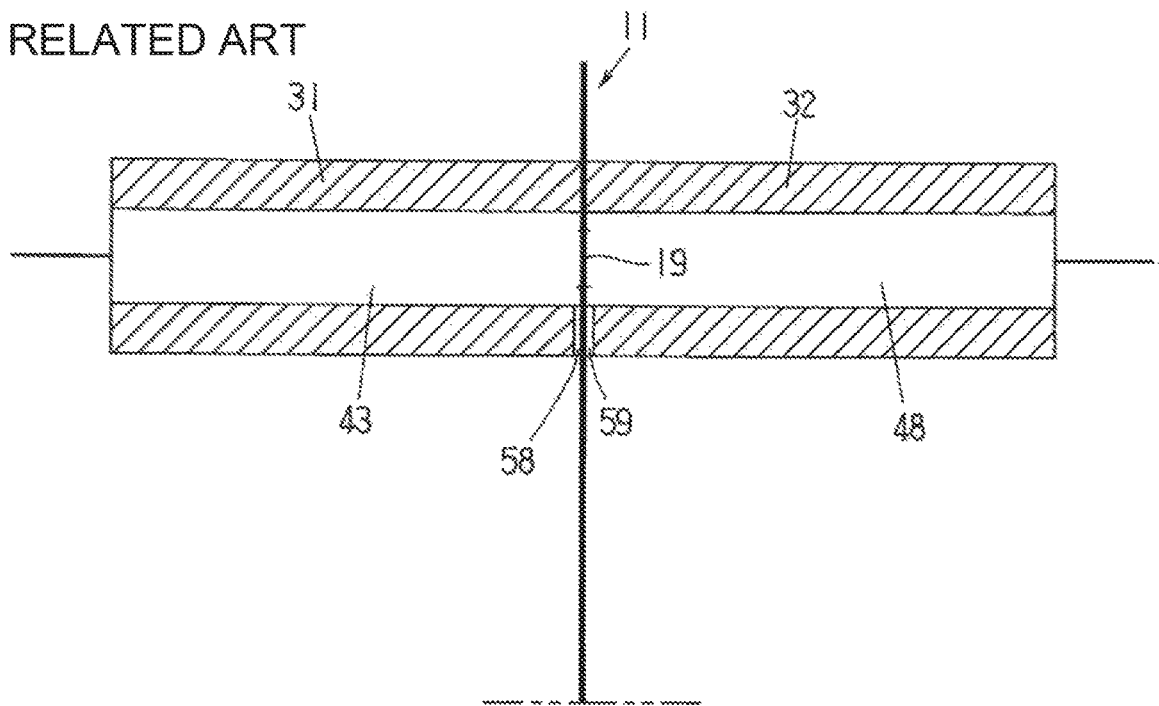
FIG. 18 is a cross-section view of the horn and anvil in the gas trapping method shown in FIG. 16, when the horn and anvil clamp the films surrounding a cutout formed in the gas introduction portion of a gas compartment.

In the example shown in FIGS. 2 through 4, the gas trapping method according to the present invention (a method involving the use of the contact member 71) is applied to the First Embodiment (FIGS. 8 through 15) of the invention of Japanese Patent Application No. 2014-99452 (U.S. patent application Ser. No. 14/710,339 (U.S. Patent Application Publication No. 2015/0328855)) described above. However, the method is also applicable to the Second Embodiment, to the Third Embodiment (FIGS. 14 and 15), and to the Fourth Embodiment (FIGS. 16 through 18). Furthermore, the method of the present invention is applicable to all other embodiments disclosed in the drawings and specification of Japanese Patent Application No. 2014-99452.

Figure 5:
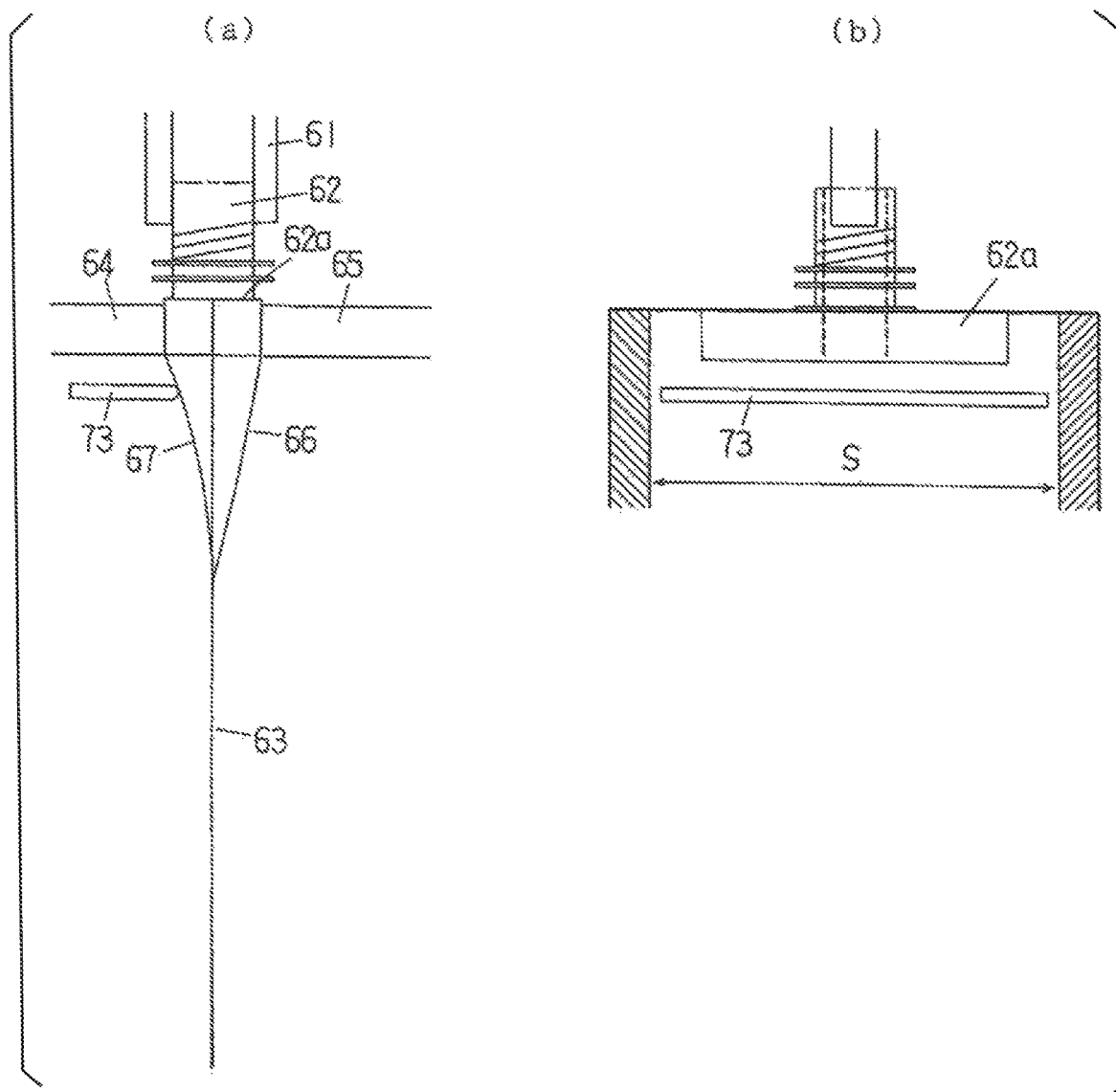
FIGS. 5((a) and (b)) shows a side view and a front view of the operation of the contact member when the ultrasonic sealing method according to the present invention is applied to manufacture of a spouted bag.
Figure 7:
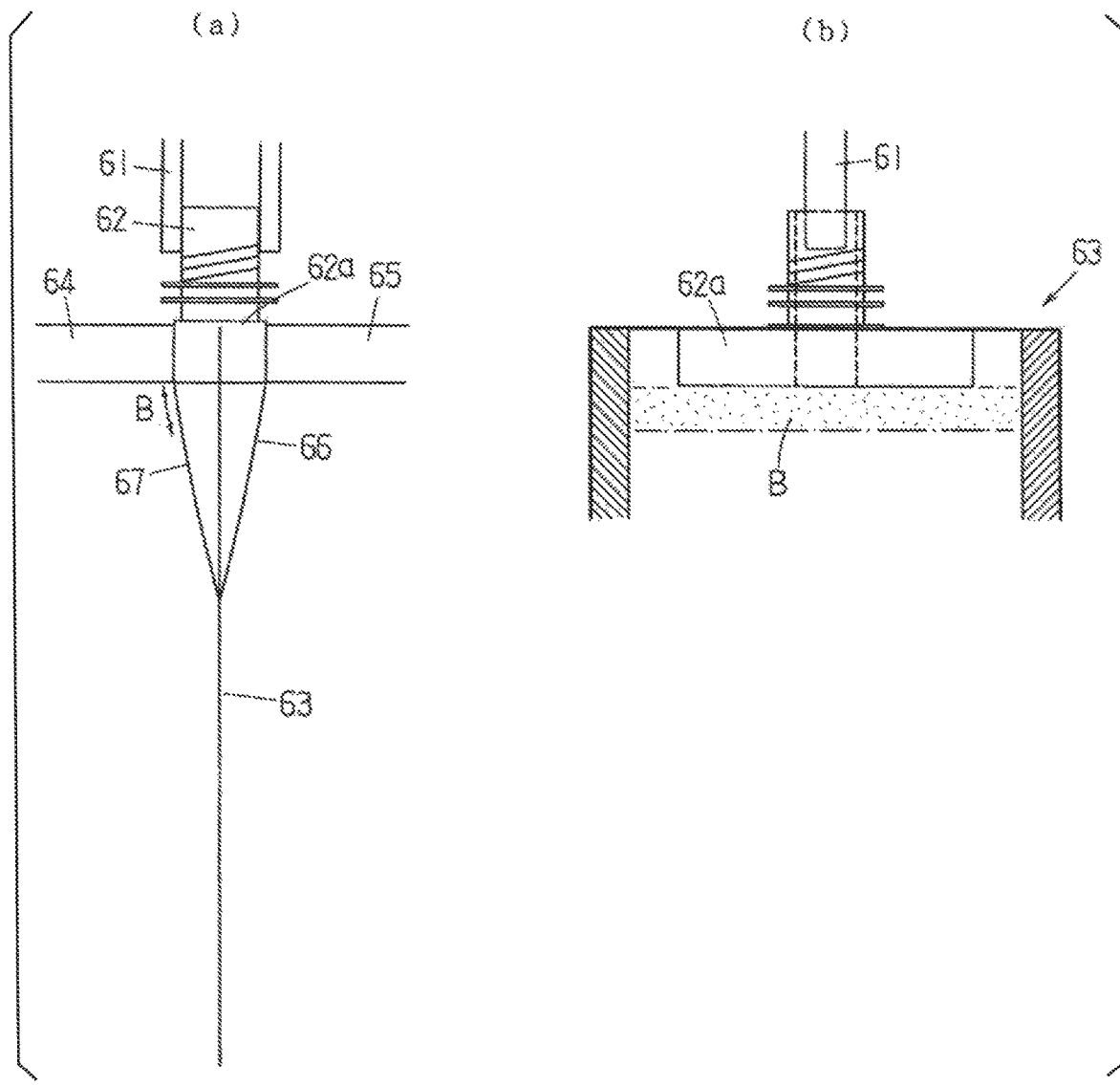
FIGS. 7((a) and (b)) illustrates the problems associated with the invention disclosed in Patent Literature 4.

Next, an ultrasonic sealing method in which the ultrasonic sealing device according to the present invention is applied to the main sealing step in the rotary spout insertion sealing device (spouted bag manufacturing apparatus) disclosed in Patent Literature 4, which involves a spout, will be described below with reference to FIG. 5. Those components that are substantially the same as the spout, bag, and ultrasonic sealing device (horn and anvil) shown in FIG. 7 are numbered the same in FIG. 5.

The above-described spouted bag manufacturing apparatus is provided with a spout conveyance device that includes a plurality of sets of spout holding members 61 that are moved intermittently along an annular movement path while gripping the upper end of a spout 62. As described previously, while these spout holding members 61 are making one rotation around the movement path, the spouts 62 are successively supplied to the spout holding members 61, and these spouts 62 are held vertically by the spout holding members 61 as they are conveyed along the conveyance path. While the spouts 62 are being conveyed, a step of inserting and temporary sealing of the bag 63, a step of sealing one or more times, and a step of cooling the sealed part are carried out successively.

The above-described spouted bag manufacturing apparatus includes an ultrasonic sealing device near the stop position where the main sealing step is performed. This ultrasonic sealing device comprises the horn 64 and the anvil 65, as well as a contact member 73 provided directly below the horn 64. The contact member 73 is fixed to an attachment member of the horn 64 (see the attachment member 41 in FIG. 1) and is moved forward and backward with the horn 64, in the same direction as the horn 64, at a position directly below the horn 64. A rubber piece is attached as necessary to the distal end of the contact member 73 so as to prevent damages to the bag 11.

When the spout holding member 61 is stopped at the above-described stop position, the horn 64 and the anvil 65 are moved forward, films 66 and 67 on both sides of the bag 63 are clamped by the horn 64 and the anvil 65 at the location of the lower potion (to-be-sealed portion) 62*a* of the spout, and at the same time the contact member 73 is moved forward until its distal end touches and is pressed against the film 67 on the horn 64 side, at a location directly below the site that is clamped between the horn 64 and the anvil 65 (the clamped site). The location that the contact member 73 is in contact with film is the region adjacent to the above-described clamped site (region B shown in FIG. 7). Consequently, the film 67 on the horn 64 side take a shape in which it is, directly below the clamped site, distended inward from a shape that is naturally opened (see FIG. 7). The contact member 73 in top view preferably has a width that is greater than or equal to the width S (see FIG. 5) of the unsealed part of the bag 63, and it is pressed against the film 67 for over substantially the entire width of this unsealed part.

Ultrasonic vibration is next generated from an ultrasonic vibration generator (see the ultrasonic vibration generator 36 of FIG. 1), and the ultrasonic vibration energy is supplied to the horn 64, which seals the films 66 and 67 on both sides of the bag 63, as well as the to-be-sealed portion 62*a* of the spout 62 and the films 66 and 67. During this ultrasonic sealing, the contact member 73 is kept pressing against the film 67 on the horn 64 side in the region B (see (b) of FIG. 7), which prevents damage to and hole formation in the film 67.

The invention claimed is:

1. An ultrasonic sealing method that applies a pressure from both sides of a bag with a horn and an anvil of an ultrasonic sealing device, and an ultrasonic vibration energy transmitted from the horn seals films on both sides of the bag together, wherein, when a gap is formed between the films on both sides of the bag in a region adjacent to a site sandwiched between the horn and the anvil, said method moves a contact member from a horn side toward said region and presses said contact member against film on the horn side, and then in this state supplies ultrasonic vibration energy to the horn, wherein:

the bag includes a gas compartment that extends in a longitudinal direction thereof and is integrally formed at a sealed part of a side edge of the bag-and includes an air intake configured to enable pressurized gas to flow to an inside of the gas compartment to from an outside of the bag, the air intake formed in a film of a gas introduction portion of the gas compartment, the region is below the horn and towards the gas compartment of the bag, the gap is a gap that is formed in the gas compartment when the gas compartment is inflated, at least one of said horn and said anvil defines a gas channel that is connected at one end thereof to a pressurized gas supply source and opens at another end thereof to a distal end of the at least one of said horn and said anvil, said another end of said gas channel being a spray outlet for the pressurized gas, the pressurized gas is provided to the gas compartment via the gas introduction portion by at least one of said horn and said anvil to inflate the gas compartment, and the film around the air intake is ultrasonically sealed after expansion of the gas compartment caused by the pressurized gas provided to the gas compartment.

2. The ultrasonic sealing method according to claim 1, wherein, before the gas compartment is inflated, said contact member is moved to a specific location, and the film on the horn side is pressed against the contact member when the gas compartment is inflated.

3. The ultrasonic sealing method according to claim 1, wherein the region is between the horn and conveyance grippers.

4. The ultrasonic sealing method according to claim 1, wherein the contact member does not extend to or past a distal end of the horn.

5. The ultrasonic sealing method according to claim 1, wherein the contact member is applied with the horn, and wherein the contact member prevents formation of a portion of the gap or reduces a size of the gap during formation of the gap.

6. An ultrasonic sealing method, the method comprising:

moving, a horn and an anvil of an ultrasonic sealing device, to apply a pressure from both sides of a bag during inflation of the bag, wherein the pressure is configured to cause a gap to form between films on both sides of the bag in a region adjacent to a portion of the bag positioned between the horn and the anvil during the inflation;

applying, a contact member, to the region to press the contact member against a film of the films to reduce a size of the gap between the films, wherein the region is below the horn and towards a gas compartment of the bag; and transmitting, by the horn, ultrasonic vibration energy to seal the films on both sides of the bag together.

7. The ultrasonic sealing method according to claim 6, wherein the region is between the horn and conveyance grippers.

8. The ultrasonic sealing method according to claim 6, wherein the contact member is applied from a horn side and reduces a portion of the gap on the horn side.

9. The ultrasonic sealing method according to claim 6, wherein the contact member does not extend to or past a distal end of the horn.

10. The ultrasonic sealing method according to claim 6, wherein the contact member is applied with the horn, and wherein the contact member prevents formation of a portion of the gap or reduces a size of the gap during formation of the gap.

11. The ultrasonic sealing method according to claim 6, further comprising, prior to moving the horn and the anvil:

applying conveyance grippers to the bag on a first side of the region opposite a second side of the region that corresponds to the horn and anvil; and conveying, by conveyance grippers, the bag into a sealing position.

12. The ultrasonic sealing method according to claim 6, further comprising providing, by a gas passage defined by the horn, the anvil, or both, pressurized fluid to the bag to inflate the gas compartment of the bag, wherein the gap corresponds to a gap formed in the gas compartment of the bag while the pressurized fluid is being provided to the bag to inflate the gas compartment.

13. The ultrasonic sealing method according to claim 6, wherein the bag includes the gas compartment that extends in a longitudinal direction thereof and positioned within a side edge of the bag and includes an aperture that is in fluid communication with the gas compartment and positioned in a film of a gas introduction portion of the gas compartment, the gap is a gap that is formed in the gas compartment when the gas compartment is inflated, at least one of the horn or the anvil is defines a gas passage that is coupled to a pressurized gas supply source at a proximal end and that includes an outlet for a pressurized gas at a distal thereof, the pressurized gas is blown into the gas compartment through the gas introduction portion by at least one of the horn or the anvil to inflate the gas compartment, and the film around the aperture is then ultrasonically sealed.

14. The ultrasonic sealing method according to claim 13, wherein, before the gas compartment is inflated, the contact member is moved with the horn, and the film on a horn side is pressed against the contact member when the gas compartment is inflated.

15. The ultrasonic sealing method according to claim 6, wherein the contact member is applied after the horn is moved, and wherein the contact member prevents formation of a portion of the gap or reduces a size of the gap during formation of the gap.

16. The ultrasonic sealing method according to claim 12, wherein the pressurized fluid is provided after the horn and the anvil are moved.

17. The ultrasonic sealing method according to claim 1, wherein the gas introduction portion is positioned at an upper end of the gas compartment.

* * * * *